US009884942B2

(12) United States Patent
Ward et al.

(10) Patent No.: US 9,884,942 B2
(45) Date of Patent: Feb. 6, 2018

(54) MALEIMIDE RESINS

(71) Applicant: Cytec Industries Inc., Woodland Park, NJ (US)

(72) Inventors: Steven Richard Ward, Stockton-on-Tees (GB); Paul Mark Cross, York (GB); Robin Maskell, Phoenix, AZ (US)

(73) Assignee: CYTEC INDUSTRIES INC., Woodland Park, NJ (US)

( * ) Notice: Subject to any disclaimer, the term of this patent is extended or adjusted under 35 U.S.C. 154(b) by 482 days.

(21) Appl. No.: 14/356,173

(22) PCT Filed: Dec. 20, 2012

(86) PCT No.: PCT/US2012/070751
§ 371 (c)(1),
(2) Date: May 5, 2014

(87) PCT Pub. No.: WO2013/096523
PCT Pub. Date: Jun. 27, 2013

(65) Prior Publication Data
US 2014/0309352 A1    Oct. 16, 2014

Related U.S. Application Data

(60) Provisional application No. 61/579,561, filed on Dec. 22, 2011.

(51) Int. Cl.
*C08G 69/26* (2006.01)
*C08G 75/205* (2016.01)
*C08L 79/08* (2006.01)
*C08G 75/23* (2006.01)
*C08K 7/04* (2006.01)
*C08K 7/06* (2006.01)
(Continued)

(52) U.S. Cl.
CPC .......... *C08G 75/205* (2013.01); *C08G 75/23* (2013.01); *C08K 7/04* (2013.01); *C08K 7/06* (2013.01); *C08K 7/10* (2013.01); *C08K 7/14* (2013.01); *C08L 79/085* (2013.01); *C08L 81/06* (2013.01); *C08K 5/42* (2013.01)

(58) Field of Classification Search
CPC . C08G 75/23; C08K 7/04; C08K 7/06; C08K 7/10; C08K 7/14
USPC ...................................................... 524/606
See application file for complete search history.

(56) References Cited

U.S. PATENT DOCUMENTS 4,608,426 A    8/1986  Stern
4,749,767 A *  6/1988  Chaudhari ......... C07D 207/448
                                                428/473.5

(Continued)

OTHER PUBLICATIONS

Chisari et al, "Poly(ether sulphone) copolymers w novel reactive chain-ends", Polymer, Elsevier Science Publishers B.V., GB, vol. 41, No. 6, Mar. 1, 2000.

*Primary Examiner* — Jane L Stanley
(74) *Attorney, Agent, or Firm* — Thi Dang

(57) ABSTRACT

A curable polymer composition comprising:
(A) a thermoset maleimide resin precursor component;
and further comprising one or both of:
(B) an arylsulphone-containing maleimide component; and
(C) a polyarylpolymer thermoplastic toughening agent component,
wherein in the absence of component (B), said component (C) comprises one or more maleimide pendant and/or end groups,
and thermoset resins and composites derived therefrom.

18 Claims, 5 Drawing Sheets

Figure 1:
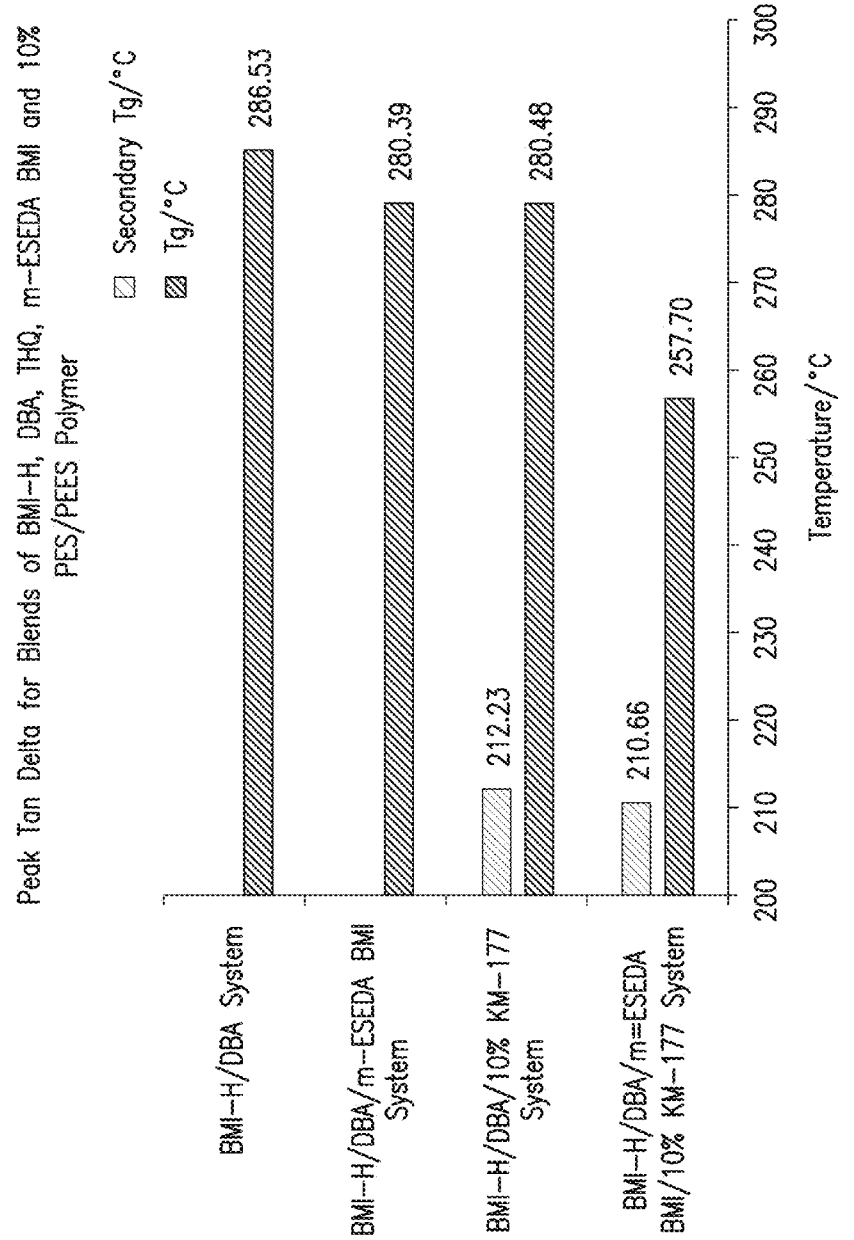

(51) Int. Cl.
    *C08K 7/10*         (2006.01)
    *C08K 7/14*         (2006.01)
    *C08L 81/06*       (2006.01)
    *C08K 5/42*         (2006.01)

(56) References Cited

U.S. PATENT DOCUMENTS

| | | | | |
|---|---|---|---|---|
| 4,826,929 | A | * | 5/1989 | Ryang ................... C08L 79/085 |
| | | | | 525/479 |
| 4,972,031 | A | * | 11/1990 | Choate ................... C08L 61/06 |
| | | | | 524/456 |
| 5,231,150 | A | * | 7/1993 | McGrail ................ C08G 75/23 |
| | | | | 523/435 |
| 5,434,224 | A | | 7/1995 | McGrail et al. |
| 6,265,491 | B1 | * | 7/2001 | Carter ................... C08G 59/68 |
| | | | | 525/132 |
| 2004/0030061 | A1 | * | 2/2004 | McGrail ................ C08J 5/24 |
| | | | | 525/537 |

\* cited by examiner

MALEIMIDE RESINS

This application is a national stage entry of International Application No. PCT/US2012/070751 filed Dec. 20, 2012, which claims benefit of priority from U.S. Provisional Application No. 61/579,561 filed Dec. 22, 2011, both of which are incorporated herein by reference.

The present invention relates to the preparation of new maleimide-terminated sulfone-containing molecules, oligomers and polymers, and their use as compatibilising agents for toughening agents in maleimide resins, as well as their use as toughening agents in maleimide resins in their own right.

Laminated polymer matrix composite structures (PMCs) are widely used in a number of applications. For example, composite structures are being increasingly used in high performance aerospace applications. PMCs combine selectively oriented fibers that are enveloped in a surrounding polymeric matrix material. These composite structures exhibit good mechanical properties for their weight (e.g., strength, stiffness, toughness), as well as a wide servicetemperature window and ease of manufacture, making them well suited for aerospace applications.

Most polymer composites employ epoxy resins, owing to the good combination of mechanical properties wide service-temperature range, and ease of part manufacture afforded by epoxies.

However, some composite applications require high thermal durability in the finished composite and PMC parts used in extreme environments, such as high temperature applications, can lack adequate thermal durability. For example, epoxies may exhibit significant weight loss after long durations at high temperatures. Currently, there are no cost-effective polymer matrix composites that can withstand extreme environments.

Polymers such as bismaleimides (BMIs) are gaining acceptance in aerospace applications that require service-temperatures beyond the capability of epoxy resins. BMIs possess higher glass transition temperatures (Tg) than epoxies and exhibit relatively low weight-loss during thermal ageing. BMIs also exhibit epoxy-like processing properties and high temperature durability.

However, while the glass transition temperatures of BMIs are higher than those of epoxies, BMIs are also relatively brittle. As a result, BMI composites tend to exhibit poor damage tolerance and poor temperature cycling resistance to micro-cracking.

Furthermore, attempts to toughen BMIs through additives have proven relatively unsuccessful. For example, toughening agents typically employed in epoxy compositions, such as carboxyl-terminated butadiene acrylonitrile (CTBN), butadiene, and styrene type rubbers, have been observed to either reduce the Tg or promote high weight loss during thermal ageing. Thermal exposure may also reduce the effectiveness of these types of rubbers.

Toughening of bismaleimide systems has been limited to the use of rubbers, modified bismaleimide monomers and low performance thermoplastics, but these also reduce the beneficial properties of bismaleimides, most notably the modulus and high glass transition temperature.

An alternative method of toughening is the use of thermoplastic toughening agents. However, typically, bismaleimides have a very poor compatibility with commonly used thermoplastic toughening-agents, and this incompatibility leads either to difficulty in dissolving the thermoplastic material into the base resin during formulation or to the gross phase separation of the thermoplastic during cure.

There is currently no available bismaleimide formulation that retains all of the beneficial properties of neat bismaleimides but that exhibits toughness suitable for high performance applications.

It is an object of this invention to solve one or more of the afore-mentioned problems.

In particular, it is an object of this invention to provide a thermoset resin which exhibits high toughness and excellent modulus, and which preferably also exhibits excellent thermal properties (including high Tg, good thermo-oxidative stability and high-temperature durability). The resin should preferably also exhibit excellent solvent uptake properties (for instance as measured by water uptake or MEK uptake, as known in the art). The resin should also exhibit homogenous morphology (in the sense that morphology is consistent throughout the material), and in particular homogenous fine particulate morphology. The resin should also exhibit good damage tolerance and good temperature cycling resistance to micro-cracking.

It is a further object of the invention to provide a toughened maleimide thermoset resin without significant detriment to the resin's thermal properties and/or solvent uptake properties, and with improvements in at least some of the afore-mentioned mechanical properties of the maleimide resin.

According to the present invention, there is provided a curable polymer composition comprising:
(A) a thermoset maleimide resin precursor component;
and further comprising one or both of:
(B) an arylsulphone-containing maleimide component; and
(C) a polyarylpolymer thermoplastic toughening agent component,
wherein in the absence of component (B), said component (C) comprises one or more maleimide pendant and/or end groups.

In a most preferred embodiment, the curable polymer composition comprising both an arylsulphone-containing maleimide component (B) and a polyarylpolymer thermoplastic toughening agent component (C), wherein said component (C) comprises a polyarylpolymer thermoplastic toughening agent (C-i) which does not comprise maleimide pendant and/or end-groups. In this embodiment, the composition may optionally further comprise a polyarylpolymer thermoplastic toughening agent (C-ii) which comprises one or more maleimide pendant and/or end-groups In an alternative embodiment, the curable polymer composition comprises both an arylsulphone-containing maleimide component (B) and a polyarylpolymer thermoplastic toughening agent component (C), wherein said component (C) comprises a polyarylpolymer thermoplastic toughening agent (C-ii) which comprises one or more maleimide pendant and/or end-groups.

In a further alternative embodiment, the curable polymer composition does not comprise said polyarylpolymer thermoplastic toughening agent component (C). In this embodiment, the curable polymer composition preferably further comprises one or more toughening agent(s) other than a polyarylpolymer thermoplastic toughening agent.

In a less preferred embodiment, the curable polymer composition does not comprise the arylsulphone-containing maleimide component (B), but said component (C) comprises a polyarylpolymer thermoplastic toughening agent (C-ii) which comprises one or more maleimide pendant and/or end groups. In this embodiment, the curable polymer composition may further comprises a polyarylpolymer thermoplastic toughening agent (C-i) which does not comprise maleimide pendant and/or end-groups.

Thus, the compositions of the present invention preferably comprise component (B).

In the compositions of the present invention, any or each of said toughening agents may be in particulate form. In particular, component (C) as defined herein may be in the form of a particulate cross-linked polyarylpolymer, particularly said polyarylpolymer thermoplastic toughening agent (C-i) which does not comprise maleimide pendant and/or end-groups In addition to the toughening agent of component (C), the compositions of the present invention may further comprise one or more additional toughening agent(s), particularly wherein at least one of said additional toughening agent(s) is/are in particulate form.

In one embodiment of the present invention, said maleimide resin precursor is a bismaleimide resin precursor. Additionally, or alternatively, said arylsulphone-containing maleimide component (B) is an arylsulphone-containing bismaleimide component.

Additionally, or alternatively, said polyarylpolymer thermoplastic toughening agent component (C) is preferably a polyarylsulphone thermoplastic toughening agent component. Additionally, or alternatively, said component (C) is a polyarylsulphone thermoplastic toughening agent component which comprises one or more bismaleimide pendant and/or end groups. This in one embodiment of the present invention, there is provided a curable polymer composition comprising:
  (A) a thermoset bismaleimide resin precursor component;
  (B) optionally an arylsulphone-containing bismaleimide component; and
  (C) a polyarylsulphone thermoplastic toughening agent component,
wherein in the absence of component (B), said component (C) comprises one or more bismaleimide pendant and/or end groups.

The compositions of the present invention optionally further comprise one or more radical inhibitor(s), and/or one or more catalyst(s). Preferably, the compositions of the present invention comprise one or more catalyst(s).

According to a further aspect of the present invention, there is provided a thermoset resin composition derived from the curing of the afore-mentioned curable polymer compositions, for instance by reaction in the presence of a curing agent.

The arylsulphone-containing maleimide component (B) is a relatively low molecular weight monomeric or oligomeric arylsulphone-containing maleimide compound which compatibilises the polyarylpolymer thermoplastic toughening agent component (C) with the thermosetting maleimide resin (A). It is believed that component (B) acts to change the solubility parameters of the base resin, allowing the morphology or particle swell to be controlled.

Where component (B) is not present, the composition comprises a component (C) which is a relatively high molecular weight polyarylpolymer containing a maleimide group which performs both toughening and compatibilising functions. The formation of maleimide groups on the ends of a polyarylpolymer thermoplastic toughening agent, allows the thermoplastic to react into, and compatibilise with, the thermosetting matrix resin (A).

The following detailed description is of the best currently contemplated modes of carrying out the invention. The description is not to be taken in a limiting sense, but is made merely for the purpose of illustrating the general principles of the invention.

The present invention allows maleimide thermosetting resins to be used in high-performance composites, for instance in demanding aerospace applications, by compatibilising thermoplastic toughening agents with the maleimide resin, thereby providing toughening without significantly reducing the modulus or Tg of the maleimide resin to an extent where the resin is unsuitable for such applications.

The use of sulfone-containing BMIs such as m-ESEDA BMI, 3'3-DDS BMI and 4'4-DDS BMI to compatibilise BMI-H/diallylbisphenol-A (DBA) blends to an amine-ended PES/PEES polymer are particularly useful, with mechanical property testing showing toughness increases compared to non-toughened resin at 10% level of thermoplastic incorporation This concept has been extended to toughening agents based on additional, higher Tg sulfone containing polymers, based on long chain dichloride (LCDC).

The Thermoset Maleimide Resin Precursor

The thermoset maleimide resin precursor component (A) comprises a polymerisable maleimide compound, and in a preferred embodiment the polymerisable maleimide compound is a polymerisable bismaleimide compound. Trifunctional and tetrafunctional precursors are encompassed by the invention. In a preferred embodiment, the precursor is di-functional and contains two maleimide moieties.

The precursor component may comprise a blend of one or more polymerisable maleimide compounds of different functionalities, i.e. one or more mono-functional and/or one or more di-functional and/or one or more tri-functional and/or one or more tetra-functional maleimides and/or one or more polymerisable maleimide compounds with greater functionality. Preferably, the precursor component comprises one or more polymerisable maleimide compound(s) of at least di-functionality (i.e. a bismaleimide), optionally with one or more mono-functional and/or tri-functional and/or tetra-functional maleimide(s), and/or one or more polymerisable maleimide compounds with greater functionality. In a further embodiment, the precursor component comprises one or more polymerisable maleimide compound(s) of tri- or tetra-functionality, optionally with one or more mono-functional and/or di-functional maleimides, and/or one or more polymerisable maleimide compounds with greater functionality. Thus, the precursor may comprise one or more mono-functional compound(s), in which there is a single maleimide moiety in the compound(s), but the precursor is preferably at least di-functional, enabling the formation of cross-links.

The present invention is described hereinbelow with particular reference to bismaleimide resin precursors. Embodiments in which the resin precursor component comprises maleimides of other functionality, as is known and conventional in the art and as described hereinabove, will be apparent to the skilled person.

Examples of suitable bismaleimides are disclosed in U.S. Pat. Nos. 4,644,039 and 5,003,018, and the specific disclosures of such maleimides therein are hereby incorporated by reference. Further suitable bismaleimide resins may include, but are not limited to, toluene diamine bismaleimide (TDA-BMI) and 4,4 bismaleimidodiphenylmethane (e.g., Matrimid 5292A, Huntsman Corp.).

The BMIs are generally prepared by the reaction of maleic anhydride, or substituted maleic anhydrides, with a suitable diamine. Both aromatic and aliphatic diamines are suitable for preparation of the BMI. The composition of the present invention may comprise both aromatic and aliphatic BMIs. Polyamines are used for maleimides of higher functionality.

Suitable aromatic diamines include the various toluene diamines and methylene dianilines. Other aromatic diamines which are useful include 1,3- and 1,4-phenylenediamine, and the 2,2'-, 2,4'-, 3,3'-, and 4,4'-diaminodiphenylsulfones, diaminodiphenylisopropylidenes, diaminodiphenylketones, diaminodiphenyloxides, and diaminodiphenylsulfides.

Suitable aliphatic diamines include the linear and branched $C_{2-20}$ alkylene diamines, for example ethylenediamine, 1,3 -propylenediamine, 1,4-butylenediamine, 1,5-pentanediamine, 1,6-hexanediamine, 1,8-octanediamine, 1,10-decanediamine, 1,12-dodecanediamine, 2,2,4-trimethyl-1,6-hexanediamine, isophoronediamine, 1,3- and 1,4-cyclohexanediamine, xylylenediamine, and diamines containing the tricyclodecane structure derived from dicyclopentadiene. Thus, examples of aliphatic BMIs include, but are not limited to, those derived from trimethylhexanediamine (TMH-BMI) and hexanediamine (hexamethylene diamine bismaleimide or HMDA-BMI).

Bismaleimides derived from diamines containing heteroatoms are also useful, for example those derived from amino-terminated polyethersulfones, polyetherketones, polyetherketoneketones, polyetheretherketones and similar oligomers as prepared in accordance with U.S. Pat. No. 4,175,175, as well as amino-terminated polyoxyalkylene polyethers, amino-terminated N,N-dialkylpiperidines, and the like.

Also useful are polyaminobismaleimide prepolymers which may be prepared through the reaction of a stoichiometric excess of one or more bismaleimides with a di- or polyamine. Such polyaminobismaleimides or related products may also be prepared in situ by including in the resin system, one of the aforementioned diamines, preferably one of the diaminodiphenylsulfones.

The so-called eutectic bismaleimides which are mixtures of two or more different bismaleimide monomers are also useful. Through the use of such mixtures, the melting point of the bismaleimide component may be considerably depressed over the melting point of the separate bismaleimide monomers. Preferably, ternary or higher mixtures are utilized, for example mixtures containing the bismaleimides of the toluenediamines, diaminodiphenylmethanes, and one or more aliphatic diamines such as 1,8-octanediamine, 1,12-dodecanediamine, or 2,2,4-trimethyl-1,6-hexanediamine. Such eutectics are readily available in commercial embodiments.

In a preferred embodiment, the composition further comprises one or more co-reactants, or comonomers. Such co-reactants are normally, and indeed are preferably, liquid co-reactants. These comonomers may be comonomers which react with the bismaleimide monomers, or which react with themselves or with other comonomers or may be the same or a different bismaleimide resin in liquid form. Such comonomers include, for example, those discussed in U.S. Pat. Nos. 4,100,140 and 4,035,345. which are incorporated herein by reference. Allylnadicimide resins, epoxy resins, di- and poly-amines, cyanate resins, unsaturated polyester resins, and alkenylphenol-terminated compounds are useful. Comonomers characterized by the presence of one or more —CH=$CH_2$, >C=$CH_2$, or —C=CH— groups polymerizable with the carbon-carbon double bonds of the maleimide groups are also useful, and such co-monomers include N-vinyl-2-pyrrolidinone, ethylene glycol dimethacrylate, diethylene glycol dimethacrylate, trimethylolpropane triacrylate, trimethylolpropane trimethacrylate, pentaerythritol triacrylate, pentaerythritol tetraacrylate, pentaerythritol tetramethacrylate, triallyl isocyanurate, diallyl phthalate, triallyl trimellitate, divinyl benzene, dicyclopentadienyl acrylate, dicyclopentadienyl oxyethyl acrylate, vinylcyclohexene monoepoxide, 1,4-butanediol divinyl ether, 1,4-dihydroxy-2-butene, styrene, alpha methyl styrene, chlorostyrene, p-phenylstyrene, t-butylstyrene, phenyl vinyl ether, unsaturated polyesters, vinyl ester resins, and the like. Silicone rubbers may also be utilized as comonomers, particularly those terminated with maleimide, epoxy, vinyl and amino groups. The co-reactants are suitably unsaturated organic compounds, particularly those having multiple unsaturations. The unsaturation may be ethylenic or acetylenic in nature.

The co-reactants may be present in a concentration up to about 40 wt %, preferably up to about 30 wt %, on the basis of the total weight of the polymer composition.

Particularly preferred comonomers are the alkenyloxyphenols and alkenylphenols, for instance those described in U.S. Pat. No. 4,100,140. Preferably, the co-reactant is selected from o,o'-diallylbisphenols, o,o'-dipropenylbisphenols, and allylphenoxy, propenylphenoxy, allylphenyl and propenyphenyl-terminated oligomeric compounds. Suitable are, for example, o,o'-diallyl- and o,o'-dipropenylbisphenols such as o,o'-diallyl- and o,o'-dipropenylbisphenol A, bisphenol F and/or bisphenol S. Also suitable are the alkenylphenol- and alkenyloxyphenyl terminated dicyclopentadienes. Examples include o,o'-diallylbisphenol A (e.g., Matrimid®05292B, Huntsman Corp), o,o'-diisopropenyl-bisphenol A, allyleugenol, alkenylphenoxybenzophones and the like.

In one embodiment, the only co-reactant present with the maleimide resin precursors are said alkenyloxyphenols and alkenylphenols.

Allylnadicimides are suitable as co-reactants, as described in U.S. Pat. Nos. 4,666,997 and 4,667,003. Suitable nadicimides of toluenediamine, aliphatic amines, methylenedianiline, aliphatic diamines, isophorone diamine, and the like.

The composition may comprise one or more low viscosity epoxy resins as coreactants, present in minor amounts. The epoxy groups can be terminal epoxy groups or internal epoxy groups. The epoxides are of two general types: polyglycidyl compounds or products derived from epoxidation of dienes or polyenes. Suitable epoxy resins include, but are not limited to, bisphenol A-based epoxies, bisphenol-based F epoxies or resorcinol-based epoxies. Examples of such resins are the bisglycidyl ethers of the bisphenols, particularly bisphenol A, bisphenol F and bisphenol S. Also suitable are the various phenolic and cresolic novolac-type resins, as well as the various glycidoxy amines and amino-phenols, particularly N,N,N',N'-tetrakis(glycidyl)-4,4'-diaminodiphenylmethane and N,N,O-tris(glycidyl)-4-aminophenol. Epoxy resin based on the glycidyl ethers of the various dihydroxynaphthalenes and phenolated dicyclopentadienes are also suitable. Other examples may include liquid epoxy resins listed in Handbook of Epoxy Resins by Lee and Neville, McGraw-Hill, and Epoxy Resins, Chemistry and Technology, May, Ed., Marcel Dekker, 1973, the entirety of which is hereby incorporated by reference. The epoxy resins may be present in a concentration from about 2 to about 10 wt % on the basis of the total weight of the composition. In further embodiments, the epoxy resins may be present in a concentration from about 3 to about 7 wt %, on the basis of the total weight of the composition.

If epoxy resins are used as co-reactants, it is desirable to add an aromatic diamine to the formulation, as described elsewhere herein. The diamine should have a low level of reactivity with epoxy resin and the bismaleimide at room temperature. A stoichimetry of 0.1 to 1.0 equivalents of —NH per equivalent of (1,2-epoxide group plus maleimide group) may be used. Diamines are also suitable even if no epoxy is present in the composition, for the reasons described elsewhere herein.

The composition may additionally contain an accelerator to increase the rate of cure of the epoxy plus amine reation. Accelerators which may be used herein include Lewis acids; amine complexes such as $BF_3$.monoethylamine, $BF_3$.piperdine, $BF_3$.2-methylimidazole; amines, such as imidazole and its derivatives such as 4-ethyl-2-methylimidazole, 1-methylimidazole, 2-methylimidazole; N,N-dimethylbenzylamine; acid salts of tertiary amines, such as the p-toluene sulfonic acid:imidazole complex, salts of trifluoro methane sulfonic acid, such as FC-520 (obtained from 3M Company), organophosphonium halides and dicyandiamide. If used, the accelerator is typically present in an amount of up to about 6wt %, and preferably at least 1 wt %, based on the weight of the epoxy component.

Cyanate functional comonomers are also useful co-reactants. Such monomers are prepared by the reaction of cyanogen chloride or bromide with a diol or polyol. Examples of suitable diols include the bisphenols, the tetramethylbisphenols, other cyanates commercially available and in the literature, resorcinol, the hydroxyalkcyanurates and isocyanurates and the like. Such cyanate systems are well known to those skilled in the art, and are commercially available from a number of sources. Their preparation is also well known, and may be accomplished by the methods proposed in U.S. Pat. No. 4,546,131. Cyanate resins are suitably used in conjunction with a catalyst. Examples of the cyanate ester include cyanatobenzene, dicyanatobenzene; 1,3,5-tricyanatobenzene; 1,3-, 1,4-, 1,6-, 1,8-, 2,6-or 2,7-dicyanatonaphthalene; 1,3,6-tricyanatonaphthalene; 4,4'-dicyanatobiphenyl; bis(4-cyanatophenyl)methane; 2,2-bis(4-cyanatophenyl)propane, 2,2-bis(3,5-dichloro-4-cyanatophenyl)propane, 2,2-bis(3,5-diblomo-4-dicyanatophenyl)propane; bis(4-cyanatophenyl)ether; bis(4-cyanatophenyl)thioether; bis(4-cyanatophenyl)sulfone; tris (4-cyanatophenyl)phosphite; tris(4-cyanatophenyl) phosphate; bis(3-chloro-4-cyanatophenyl)methane; cyanated novolak derived from novolak cyanated disphenol type polycarbonate oligomer derived from bisphenol type polycarbonate oligomer and mixture thereof. Cyanate esters may be used as mixtures. Prepolymers may be used containing a sym-triazine ring which is prepared by the trimerization of the cyanate groups of the cyanate ester, and which have an average molecular weight of at least 400 but no more than 6,000. Such prepolymers can be prepared by polymerizing the above cyanate esters in the presence of, as a catalyst, an acid such as a mineral acid or Lewis acid, a base such as sodium hydroxide, a sodium alcoholate or a tertiary amine, or a salt such as sodium carbonate or lithium chloride. The cyanate ester can be used in the form of a mixture of the monomer and the prepolymer.

Catalysts are preferably present in the compositions of the present invention, preferably in amounts of from about 0.01 to about 5.0 wt %, on the basis of the total weight of the composition. Preferred catalysts include triphenylphosphine, the various tertiary amines, imidazoles, or diamines. The comonomers may require a catalyst for their polymerization.

The composition may also comprise one or more inhibitor compounds which reduce the reactivity of the formulation components, notably for inhibition of vinyol polymerisations. Appropriate inhibitors are known in the art, for instance as more fully described in U.S. Pat. No. 5,955,566, the entirety of which are hereby incorporated by reference.

Specific examples include, but are not limited to, hydroquinone, t-butyl hydroquinone, benzoquinone, p-methoxyphenol, and 4-nitro-m-cresol and 1,4-napthoquinone hydrate. Hydroquinones are used in most commercial applications, and its presence is therefore preferred in the compositions of the present invention. The inhibitor compounds may be present in a concentration up to about 2 wt %, and typically at least 0.5 wt %, on the basis of the total weight of the composition.

The composition may also include an initator for vinyl polymerization such as di-t-butyl peroxide, dicumyl peroxide, 1,1-bis-(t-butylperoxy)cyclohexane, azo-bis(isobutyronitrile), t-butyl perbenzoate, and the like. The initiator typically comprises from 0 to about 3wt %, based on the total weight of the composition.

The composition may also comprise one or more flow control agents for adjustment of the viscosity of the composition. The flow control agents may comprise thermoplastics. Examples of such thermoplastics may include, but are not limited to, polyimides. The flow modifiers may be present in a concentration from about 0.5 to about 3 wt % on the basis of the total weight of the composition.

The compositions of this invention may optionally contain a thermoplastic polymer, such as the polyarylene polyethers described in U.S. Pat. Nos. 4,108,837, 4,175,175 and 3,332,209. These materials have beneficial effects on the viscosity and film strength characteristics of the bismaleimide/liquid coreactant mixture. Also suitable in this regard are polyhydroxyethers; and polycarbonates (such as those based on bisphenol A, tetramethyl bisphenol A, 4,4'-dihydroxydiphenyl sulfone, 4,4'-dihydroxy-3,3', 5,5'-tetramethyl-diphenyl sulfone, hydroquinone, resorcinol, 4,4'-dihydroxy-3,3', 5,5'-tetramethyl diphenyl sulfide, 4,4'biphenol, 4,4'-dihydroxydiphenyl sulfide, phenolphthalein, 2,2,4,4-tetramethyl-1,3-cyclobutane diol, and the like). Other suitable thermoplastics include poly (ε-caprolactone); polybutadiene; polybutadiene/acrylonitrile copolymers, including those optionally containing amine, carboxyl, hydroxy, or —SH groups; polyesters, such as poly(butylene terephthalate); poly(ethylene terephthalate); polyetherimides such as the Ultem® resins (obtained from the General Electric Company); acrylonitrile/butadiene/styrene copolymers, polyamides such as nylon 6, nylon 6,6, nylon 6,12, and Trogamid® T (obtained from Dynamit Nobel Corporation); poly(amide imides) such as Torlon® poly(amide imide) (obtained from Amoco Chemical Corporation, Napierville, Ill.); polyolefins, polyethylene oxide; poly(butyl methacrylate); impact-modified polystyrene; sulfonated polyethylene; polyarylates such as those derived from bisphenol A and isophthalic and terephthalic acid; poly(2,6-dimethyl phenylene oxide); polyvinyl chloride and its copolymers; polyacetals; polyphenylene sulfide and the like. Poly(vinyl acetate) and copolymers of vinyl acetate with other vinyl and acrylic monomers may also be used. Also suitable are vinyl methyl or vinyl phenyl silicone rubbers such as polymers of the formula —[$R_2$SiO]— wherein up to 10% of the R groups are vinyl, the remainder being either methyl and/or phenyl. The preferred thermoplastics include polysulfones, phenoxy resins, and polyarylates.

In addition to the components discussed above, the composition may further comprise other non-reactive system auxiliary components, including, but not limited to, plasticizers, fillers, dyes, pigments, other thermoplastic tougheners, other rheology control agents, tackifiers, and the like, as are well known to those skilled in the art.

The Polyarylpolymer Thermoplastic Toughening Agent Component (C)

The polyarylpolymer thermoplastic toughening agent of component (C) contains at least one $SO_2$ group in the polymer chain, i.e. it is an arylsulphone-containing polymer. The polyarylpolymer thermoplastic toughening agent of component (C) is preferably a polyarylsulphone thermoplastic toughening agent. The thermoplastic toughening agent (C) preferably comprises one or more polyarylpolymers synthesised from sequences of (Ar), wherein (Ar) is a phenylene. These (Ar) groups are linked either as fused rings, through a single chemical bond or through any divalent group, such as, but not limited to $SO_2$, CO, O, S or a divalent hydrocarbon. Preferably, said divalent group is selected from $SO_2$, CO, O, S or a divalent hydrocarbon, and more preferably from $SO_2$, O and S. Preferably the polyarylpolymer comprises linkages of $SO_2$, O and single chemical bonds. Preferably, in any given polymer chain a number of different linkages may be present with the proviso that in all chains at least one $SO_2$ occurs.

The polyarylpolymer preferentially has reactive pendant and/or end groups that may, if desired, be used for cross-linking to form particulate species.

The phenylene groups in the polyarylpolymer may be substituted by one or more substituent groups (R), each independently selected from $C_{1-8}$ branched or straight chain aliphatic saturated or unsaturated aliphatic groups or moieties optionally comprising one or more heteroatoms selected from O, S, N, or halo (for example Cl or F); and groups providing active hydrogen especially OH, $NH_2$, $NHR^a$ or —SH, where $R^a$ is a hydrocarbon group containing up to eight carbon atoms, or providing other cross-linking activity especially epoxy, (meth)acrylate, cyanate, isocyanate, acetylene or ethylene, as in vinyl, allyl or maleimide, anhydride, oxazoline and monomers containing unsaturation.

Preferably, the phenylene group is meta- or para- (preferably para).

U.S. Pat. No. 6,437,080 discloses processes for obtaining such compositions from their monomer precursors in a manner to isolate the monomer precursors in selected molecular weight as desired, and those disclosures are incorporated herein by reference.

As noted above, the polyarylpolymer preferentially contains reactive pendant and/or end-groups. Reactive end-groups may be obtained by a reaction of monomers or by subsequent conversion of product polymers prior to, or subsequently to, isolation. Preferably groups are of formula -A'-Y which is reactive with thermosetting resins, such as, but not limited to epoxies, maleimides, cyanate esters and benzoxazines or with like groups on other polymer molecules. A' is a divalent hydrocarbon group, preferably aromatic. Examples of Y are groups providing active hydrogen, particularly OH, $NH_2$, $NHR^b$ or —SH, where $R^b$ is a hydrocarbon group containing up to eight carbon atoms, or groups providing other cross-linking activity, particularly epoxy, (meth)acrylate, cyanate, isocyanate, acetylene or ethylene, as in vinyl, allyl or maleimide, anhydride, oxazaline and monomers containing saturation.

The number average molecular weight of the polyarylpolymer is suitably in the range 2000 to 60000. Preferably, the molecular weight of polyarylsulphones suitable for use in the present invention is in the range of from about 2,000 to about 30,000, preferably from about 5,000 to about 15,000. In one embodiment, the number average molecular weight is from 6,500 to 12,000. Such polyarylpolymers increases toughness structurally as well as by chemical interaction, when compared with the thermoset resin alone, by providing zones of the tough thermoplast between cross-linked thermoset zones.

The synthesis of compounds according to component (C) is further described in US-2004/0044141, U.S. Pat. No. 6,437,080 WO-2010/138662-A and US-2012/016445-A, and those disclosures are incorporated herein by reference.

A preferred example of a polyarylpolymer suitable for use as component (C) in the present invention is illustrated by formula (I) below.

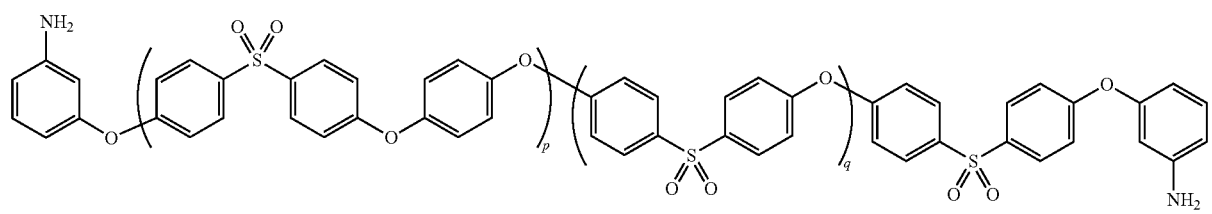

(I)

A further preferred example of a polyarylpolymer suitable for use as component (C) in the present invention is illustrated by formula (II) below.

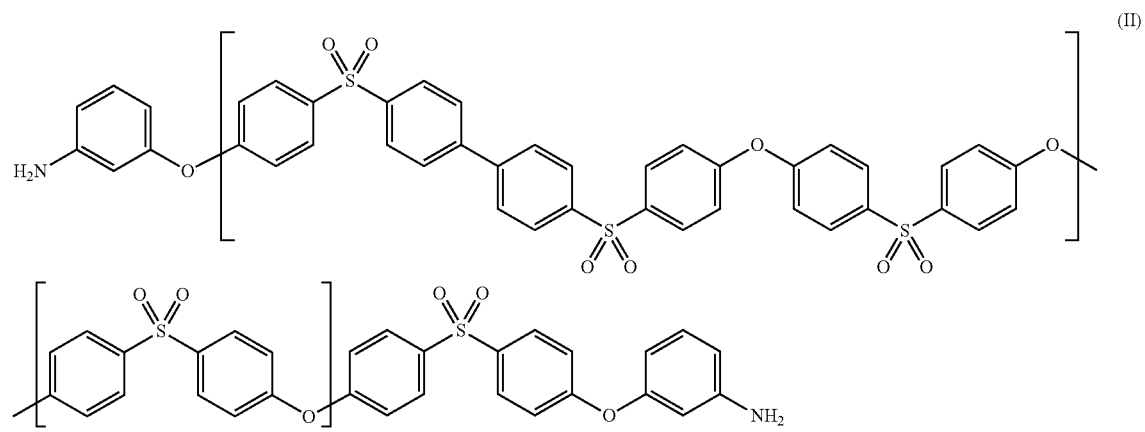
Compound (II) is a high-Tg polyarylpolymer consisting of SO$_2$, single chemical bond and O linkages, a synthesis for which is shown in Schematic 1 below.

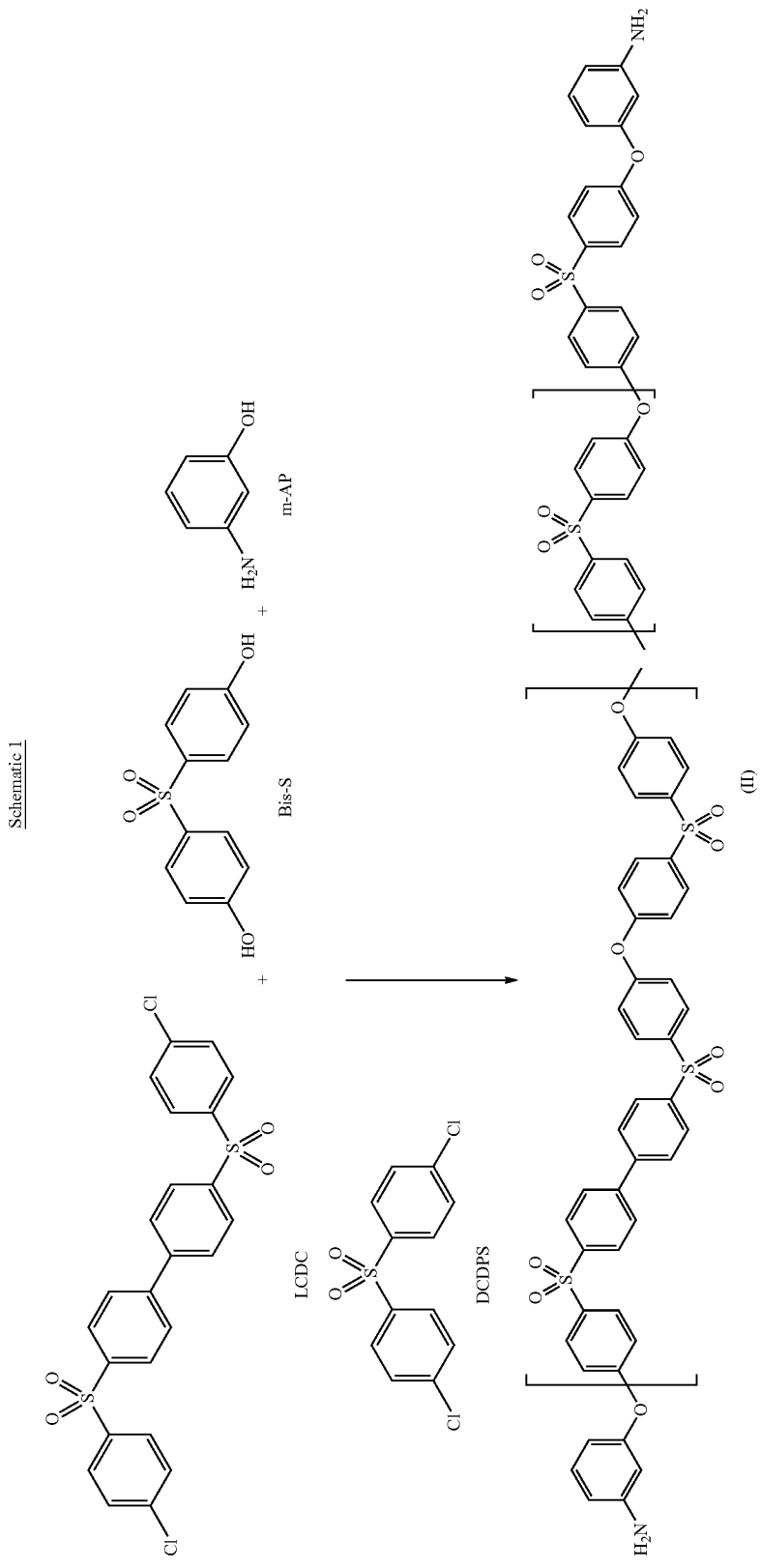

In one embodiment, the thermoplastic toughening agent (C) comprises one or more polyarylsulphone(s) comprising ether-linked repeating units, optionally further comprising thioether-linked repeating units, the units being selected from:

—[ArSO₂Ar]ₙ— and optionally from:

—[Ar]ₐ— wherein:

Ar is phenylene;

n=1 to 2 and can be fractional;

a=1 to 3 and can be fractional and when a exceeds 1, said phenylene groups are linked linearly through a single chemical bond or a divalent group other than —SO₂— or are fused together, provided that the repeating unit —[ArSO₂Ar]ₙ— is always present in the polyarylsulphone in such a proportion that on average at least two of said —[ArSO₂Ar]— units are in sequence in each polymer chain present, and wherein the polyarylsulphone has reactive pendant and/or end groups.

By "fractional" reference is made to the average value for a given polymer chain containing units having various values of n or a.

The phenylene groups in the polyarylsulphones may be substituted by one or more substituent groups (R), as defined above for the generic polyarylpolymer. Preferably, the phenylene group is meta- or para- (preferably para).

Preferably the polyarylsulphone comprises a combination of —[ArSO₂Ar]—and —[Ar]ₐ— repeating units, linked by ether and/or thio-ether linkages, preferably by ether linkages. Thus, preferably the polyarylsulphone comprises a combination of polyethersulphone (PES) and polyetherethersulphone (PEES) ether-linked repeating units.

The relative proportions of —[ArSO₂Ar]ₙ— and —[Ar]ₐ— repeating units is such that on average at least two —[ArSO₂Ar]— repeating units are in immediate mutual succession in each polymer chain present, and the ratio of —[ArSO₂Ar]ₙ— units to —[Ar]ₐ— units is preferably in the range 1:99 to 99:1, more preferably 10:90 to 90:10. Typically, the ratio [ArSO₂Ar]ₙ:[Ar]ₐ is in the range 75:25 to 50:50.

In one embodiment, the preferred repeating units in the polyarylsulphones are:

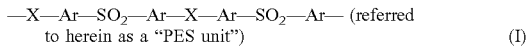

—X—Ar—SO₂—Ar—X—Ar—SO₂—Ar— (referred to herein as a "PES unit")  (I)

and

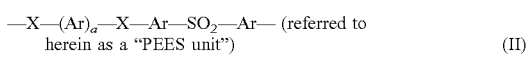

—X—(Ar)ₐ—X—Ar—SO₂—Ar— (referred to herein as a "PEES unit")  (II)

wherein:

X is O or S (preferably O) and may differ from unit to unit; and the ratio of units I:II is preferably in the range of from 10:90 to 80:20, more preferably in the range of from 10:90 to 55:45, more preferably in the range of from 25:75 to 50:50, and in one embodiment, the ratio I:II is in the range of from 20:80 to 70:30, more preferably in the range of from 30:70 to 70:30, most preferably in the range of from 35:65 to 65:35.

The preferred relative proportions of the repeating units of the polyarylsulphone may be expressed in terms of the weight percent SO₂ content, defined as 100 times (weight of SO₂)/(weight of average repeat unit). The preferred SO₂ content is at least 22, preferably 23 to 25%. When a=1 this corresponds to PES/PEES ratio of at least 20:80, preferably in the range 35:65 to 65:35.

The flow temperature of polyetherethersulphone is generally less than that of a corresponding Mn polyethersulphone, but both possess similar mechanical properties. Accordingly the ratio may be determined, by determining values for a and n above.

The above proportions refer only to the units mentioned. In addition to such units the polyarylsulphone may contain up to 50% molar, preferably up to 25% molar, of other repeating units: the preferred SO₂ content ranges then apply to the whole polymer. Such units may be for example of the formula:

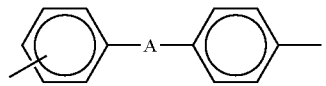

in which A is a direct link, oxygen, sulphur, —CO— or a divalent hydrocarbon radical.

When the polyarylsulphone is the product of nucleophilic synthesis, its units may have been derived for example from one or more bisphenols and/or corresponding bis-thiols or phenol-thiols selected from hydroquinone, 4,4'-dihydroxybiphenyl, resorcinol, dihydroxynaphthalene (2,6 and other isomers), 4,4'-dihydroxybenzophenone, 2,2'-di(4-hydroxyphenyl)propane and -methane. If a bis-thiol is used, it may be formed in situ, that is, a dihalide may be reacted with an alkali sulphide or polysulphide or thiosulphate.

Other examples of such additional units are of the formula:

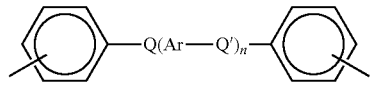

in which Q and Q', which may be the same or different, are CO or SO₂; Ar is a divalent aromatic radical; and n is 0, 1, 2, or 3, provided that n is not zero where Q is SO₂. Ar is preferably at least one divalent aromatic radical selected from phenylene, biphenylene or terphenylene. Particular units have the formula:

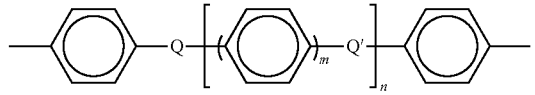

where m is 1, 2 or 3. When the polymer is the product of nucleophilic synthesis, such units may have been derived from one or more dihalides, for example selected from 4,4'-dihalobenzophenone, 4,4'bis(4-chlorophenylsulphonyl)biphenyl, 1,4, bis(4-halobenzoyl)benzene and 4,4'-bis(4-halobenzoyl)biphenyl. They may of course have been derived partly from the corresponding bisphenols.

The polyarylsulphone may be the product of nucleophilic synthesis from halophenols and/or halothiophenols. In any nucleophilic synthesis the halogen if chlorine or bromine may be activated by the presence of a copper catalyst. Such activation is often unnecessary if the halogen is activated by an electron withdrawing group. In any event, fluoride is usually more active than chloride. Any nucleophilic synthesis of the polyarylsulphone is carried out preferably in the presence of one or more alkali metal salts, such as KOH, NaOH or $K_2CO_3$ in up to 10% molar excess over the stoichiometric.

The polyarylsulphone contains reactive pendant and/or end-groups, as described hereinabove for the generic polyarylpolymer. Preferably groups are of formula -A'-Y which is reactive with epoxide groups or with curing agent or with like groups on other polymer molecules, as described hereinabove.

The number average molecular weight of the polyarylsulphone is as described hereinabove for the polyarylpolymer.

The above discussion of the polyarylpolymer thermoplastic toughening agent component (C) relates to embodiments of the invention wherein the polyarylpolymer thermoplastic toughening agent does not comprise maleimide pendant and/or end-groups, i.e. it is a polyarylpolymer thermoplastic toughening agent of type (C-i) as discussed above.

In other embodiments of the invention, the polyarylpolymer thermoplastic toughening agent comprises one or more maleimide pendant and/or end-groups, i.e. it is polyarylpolymer thermoplastic toughening agent of type (C-ii) as discussed above. In this embodiment of the invention, modification of the molecular structure of the toughening agent means that the polyarylpolymer of type (C-ii) performs the toughening function as well as the compatibilising function with the maleimide resin. In this embodiment, the polyarylsulphone is terminated by maleimide end-group(s), for instance as illustrated hereinbelow for component (B) in formula (III). Thus, a polyarylpolymer of type (C-ii) corresponds to a compound of formula (III) wherein the group ($Z^2$) is a polyarylpolymer as described hereinabove.

Compounds of type (C-ii) can be synthesized by the methods described hereinabove for component (C), using conventional methods in the art for modification of the molecular structure by the introduction of maleimide groups.

In compounds of type (C-ii), there may be 1 or 2 or more maleimide groups present in the molecule, or a blend thereof. Preferably compounds of type (C-ii) are bismaleimides, i.e. comprising two maleimide groups. In one embodiment, the composition comprises a blend of bismaleimides and monomaleimides. In a further embodiment, the composition comprises a blend of bismaleimides, in combination with one or more monomaleimides and/or one or more corresponding compounds containing greater than two maleimide groups (particularly tris- and tetrakis-maleimides).

The polyarylpolymer thermoplastic toughening agents described hereinabove, particularly toughening agents of type (C-i), may be in the form of crosslinked particles. The synthesis of such particles is described in WO-2010/138662.

The Arylsulphone-containing Maleimide Component (B)

The arylsulphone-containing maleimide component (B) may comprise 1 or 2 or more maleimide groups present in the molecule, or a blend thereof. Preferably, however, the arylsulphone-containing maleimide component (B) is a bismaleimide, i.e. comprising two maleimide groups, for instance as shown in formula (III) below. In one embodiment, the composition comprises a blend of bismaleimides and monomaleimides. In a further embodiment, the composition comprises a blend of bismaleimides, in combination with one or more monomaleimides and/or one or more corresponding compounds containing greater than two maleimide groups (particularly tris- and tetrakis-maleimides).

The arylsulphone-containing maleimide component (B) preferably has the general formula (III):

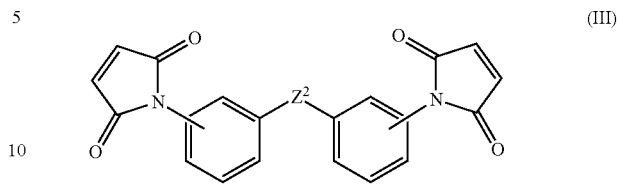

wherein $Z^2$ is a sulfone —[$SO_2$]— group or comprises one or more arylsulphone unit(s), —[Ar—$SO_2$—Ar]—, and optionally further comprises one or more arylene unit(s) —[Ar]—, wherein said arylsulphone unit(s) and arylene unit(s) are linked either as fused rings, through a single chemical bond or through any divalent group, such as, but not limited to $SO_2$, CO, O, S or a divalent hydrocarbon. Preferably, said divalent group is selected from $SO_2$, CO, O, S and a divalent hydrocarbon, and more preferably from $SO_2$, O and S.

The group Ar in formula (III) may be substituted or unsubstituted, but is preferably unsubstituted. Where substituted, one or more substituent group(s) may be present, and selected from, for instance, from alkyl (preferably $C_{1-4}$ alkyl), unsaturated hydrocarbyl and halogen groups, and preferably from $C_{1-4}$ alkyl.

Preferably, Ar is phenylene. Preferably, the phenylene group is meta- or para-.

The Ar group in formula (III) is selected independently from the Ar group in component (C). In one embodiment, the moiety $Z^2$ contains said arylsulphone units —[Ar—$SO_2$—Ar]—, and said arylene unit(s), —[Ar]—.

The compounds of component (B) can be synthesized using methods as disclosed for component (C) above.

As noted above, component (B) is a relatively low molecular weight monomeric or oligomeric arylsulphone-containing maleimide compound. Preferably, the number average molecular weight of the arylsulphone-containing maleimide component (B) is less than 2000.

Thermosetting Composition and Applications therefor

The thermoset maleimide resin precursor component (A) is reacted with one or both of component (B) and component (C), wherein in the absence of component (B) said component (C) comprises one or more maleimide pendant and/or end groups (i.e. a compound of type (C-ii)), to provide a thermoset resin composition. In any case, and as noted above, whether (B) is used alone or whether (C) is used alone (as a compound of type (C-ii)) or whether components (B) and (C) are used together, component (C) may further comprise a toughening agent which does not contain maleimide pendant and/or end groups groups (i.e. a compound of type (C-i)). An additional toughening agent may also be present, as appropriate. Preferably, there is at least one toughening agent present, i.e.

component (B) is preferably not used alone in the absence of a toughening agent. Any of said toughening agent(s) may be in the form of a particulate toughening agent, as described above. Optionally, said precursor component (A) is so reacted in the presence of one or more radical inhibitor(s) and/or one or more catalyst(s)to provide a thermoset resin composition.

Where used, the weight proportion of the arylsulphone-containing maleimide component (B) is typically at least about 12% by weight, preferably at least about 15% by weight, preferably at least about 20% by weight, preferably at least about 25% by weight, preferably at least about 30% by weight, preferably no more than about 70% by weight, preferably no more than about 60% by weight, preferably no more than about 45% by weight, preferably no more than about 40% by weight, and preferably in the range of from about 15 to about 50%, more preferably from about 20 to about 45%, and especially from about 25 to about 40% by weight of the total weight of components (A), (B) and (C) (whether present as either or both of compounds of type (C-i) and (C-ii)) in the composition.

Where used, the weight proportion of the thermoplastic polyarylpolymer toughening agent (component (C)) is typically in the range of from about 5 to about 70%, more preferably from about 5 to about 40%, and especially from about 5 to about 20% by weight of the total weight of components (A), (B) and (C) (whether present as either or both of compounds of type (C-i) and (C-ii)) in the composition.

In one embodiment, the arylsulphone-containing maleimide component (B) is preferably present in the range of from about 12 to about 70%, and otherwise as described hereinabove for the general and preferred ranges for component (B), and the thermoplastic polyarylsulphone component (C) (typically as a compound of type (C-i) is present in the range of from about 5% to about 70% and otherwise as described hereinabove for the general and preferred ranges for component (C). The percentages are percentages by weight of the component relative to the total weight of components (A), (B) and (C) (whether present as either or both of compounds of type (C-i) and (C-ii)) in the composition.

According to a further aspect of the invention there is provided a composite comprising, or derivable from, the thermoset resin compositions and curable polymer compositions described hereinabove.

According to a further aspect of the invention there is provided a method for the manufacture of a composite comprising, or derivable from, the thermoset resin compositions and curable polymer compositions described hereinabove.

The compositions described herein are particularly suitable for fabrication of structures, including load-bearing or impact resisting structures. For this purpose, the compositions may contain a reinforcing agent such as fibres. Fibres can be added short or chopped typically of mean fibre length not more than 2 cm, for example about 6 mm. Alternatively, and preferably, the fibres are continuous and may, for example, be unidirectionally-disposed fibres or a woven fabric, i.e. the composite material comprises a prepreg. Combinations of both short and/or chopped fibres and continuous fibres may be utilised. The fibres may be sized or unsized. Fibres can be added typically at a concentration of 5 to 35, preferably at least 20%, by weight. For structural applications, it is preferred to use continuous fibre for example glass or carbon, especially at 30 to 70, more especially 50 to 70% by volume.

The fibre can be organic, especially of stiff polymers such as poly paraphenylene terephthalamide, or inorganic. Among inorganic fibres, glass fibres such as "E" or "S" can be used, or alumina, zirconia, silicon carbide, other compound ceramics or metals. A very suitable reinforcing fibre is carbon, especially as graphite. Graphite fibres which have been found to be especially useful in the invention are those supplied by Amoco under the trade designations T650-35, T650-42 and T300; those supplied by Toray under the trade designation T800-HB; and those supplied by Hercules under the trade designations AS4, AU4, IM 8 and IM 7.

Thus, structural fibers useful in this invention include carbon, graphite, glass, silicon carbide, poly(benzothiazole), poly(benzimidazole), poly(benzoxazole), aluminum, titanium, boron, and aromatic polyamide fibers. These fibers are characterized by a tensile strength of greater than 100,000 psi, a tensile modulus of greater than two million psi, and a decomposition temperature of greater than 200° C. The fibers may be used in the form of continuous tows (1000 to 400,000 filaments each), woven cloth, whiskers, chopped fiber or random mat. The preferred fibers are carbon fibers, aromatic polyamide fibers, such as Kevlar®49 fiber (obtained from E. I. duPont de Nemours, Inc., Wilmington, Del.), and silicon carbide fibers.

Organic or carbon fibre is preferably unsized or is sized with a material that is compatible with the composition according to the invention, in the sense of being soluble in the liquid precursor composition without adverse reaction or of bonding both to the fibre and to the thermoset/thermoplastic composition described herein. In particular, carbon or graphite fibres that are unsized or are sized with resin precursor or (poly)arylsulphone are preferred. Inorganic fibre preferably is sized with a material that bonds both to the fibre and to the polymer composition; examples are the organo-silane coupling agents applied to glass fibre.

The composition may contain for example conventional toughening agents such as liquid rubbers having reactive groups, aggregates such as glass beads, rubber particles and rubber-coated glass beads, filler such as polytetrafluoroethylene, silica, graphite, boron nitride, mica, talc and vermiculite, pigments, nucleating agents, and stabilisers such as phosphates. The total of such materials and any fibrous reinforcing agent in the composition should be at least 20% by volume, as a percentage of the total volume of the poly(aryl)sulphone/thermoset mixture. The percentages of fibres and such other materials are calculated on the total composition after reaction or processing at the hereinbelow defined temperatures.

The composites may comprise a plurality of fiber regions and one or more interlayer region(s), wherein an interlayer region lies between the fiber-containing regions. A particulate toughening agent is preferably present in the interlayer region(s), and optionally also the fiber-containing region(s). Where both the interlayer region(s) and the fiber-containing region(s) contain particulate toughening agents, the particulate toughening agents in one of said regions may be the same as or different to the particulate toughening agents in the other of said regions. The interlayer region and/or the fiber-containing region may comprise the curable polymer composition described hereinabove.

In one embodiment, the composites are obtained from a curable composition made by mixing the thermoset maleimide resin precursor (A) together with the arylsulphone-containing maleimide component (B) and/or the polyarylpolymer (C), and (at some stage) any fibrous reinforcing agent and other materials. A solvent may be present.

In the preferred embodiment in which a co-reactant is present, particularly wherein the co-reactant is selected from the afore-mentioned alkenyloxyphenols and alkenylphenols, the composites are preferably obtained by dissolving the toughening agent(s) (particularly component(s) (C-ii) and/or (C-i)) into the co-reactant, and then mixing with the other components of the composition. Suitably the composition in the form of a resin solution is transferred onto a suitable mould or tool for preparation of a panel, prepreg or the like, the mould or tool having been preheated to a desired degassing temperature. The stable emulsion is combined with any reinforcing, toughening, filling, nucleating materials or agents or the like, and the temperature is raised to initiate curing thereof. Suitably curing is carried out at elevated temperature up to 230° C., preferably in the range of 160 to 230° C., more preferably at about 170-200° C., and with use of elevated pressure to restrain deforming effects of escaping gases, or to restrain void formation, suitably at pressure of up to 10 bar, preferably in the range of 3 to 7 bar abs. Suitably the cure temperature is attained by heating at up to 5° C./min. for example 2° C. to 3° C./min and is maintained for the required period of up to 12 hours, preferably up to 6 hours, for example 3 to 4 hours. Pressure is released throughout and temperature reduced by cooling at up to 5° C./min. for example up to 3° C./min. Post-curing at temperatures in the range of 190° C. to 230° C. may be performed, at atmospheric pressure, employing suitable heating rates to improve the glass transition temperature of the product or otherwise. The mould or tool may be constructed of any suitable material, for instance an unsaturated polyester or thermoset resin such as epoxy or bis-maleimides having a heat resistance in excess of the forming temperature to be employed. Reinforcement is suitably provided in the form of glass fibres. Composite moulds may be prepared in conventional manner for use according to the present invention.

A further procedure comprises forming incompletely cured composition into film by, for example, compression moulding, extrusion, melt-casting or belt-casting, laminating such films to fibrous reinforcing agent in the form of, for example, a non-woven mat of relatively short fibres, a woven cloth or essentially continuous fibre in conditions of temperature and pressure sufficient to cause the mixture to flow and impregnate the fibres and curing the resulting laminate.

Plies of impregnated fibrous reinforcing agent, especially as made by the procedure of one or more of EP-A 56703, 102158, 102159, can be laminated together by heat and pressure, for example by autoclave, vacuum or compression moulding or by heated rollers.

The resulting multi-ply laminate may be anisotropic in which the fibres are continuous and unidirectional, orientated essentially parallel to one another, or quasi-isotropic in each ply of which the fibres are orientated at an angle, conveniently 45° as in most quasi-isotropic laminates but possibly for example 30° or 60° or 90° or intermediately, to those in the plies above and below. Orientations intermediate between anisotropic and quasi-isotropic, and combination laminates, may be used. Suitable laminates contain at least 4 preferably at least 8, plies. The number of plies is dependent on the application for the laminate, for example the strength required, and laminates containing 32 or even more, for example several hundred, plies may be desirable. There may be aggregates, as mentioned above in interlaminar regions. Woven fabrics are an example of quasi-isotropic or intermediate between anisotropic and quasi-isotropic.

According to a further aspect of the invention, there is provided a method for the manufacture of a thermoset resin comprising disposing the composition in a suitable mould or tool, or equivalent state in which it is to be formed, subjecting the composition to a desired elevated temperature at suitable pressure, for example at atmospheric pressure, and maintaining the temperature for a required period. Preferably the temperature is selected as hereinbefore defined, with reference to the temperature sensitivity of a mould or the like which is being employed or otherwise, more preferably is less than or equal to 230° C. at elevated pressure. Preferably the time is determined as hereinbefore defined.

According to a further aspect of the invention, there is provided a prepreg comprising a thermoset resin composition as hereinbefore defined and continuous fibres, particularly a prepreg obtained by a process as hereinbefore defined.

According to a further aspect of the invention, there is provided a composite comprising a pre-preg as hereinbefore defined. The composite may comprise pre-pregs laminated together by heat and pressure, for example by autoclave, compression moulding, or by heated rollers, at a temperature above the curing temperature of the polymer composition.

The present invention is applicable to the manufacture of composites by conventional prepreg technology and also by resin infusion technology (as described for instance in US-2004/0041128). Resin infusion is a generic term which covers processing techniques such as Resin Transfer Molding (RTM), Liquid Resin Infusion (LRI), Vacuum Assisted Resin Transfer Molding (VARTM), Resin Infusion with Flexible Tooling (RIFT), Vacuum Assisted Resin Infusion (VARI), Resin Film Infusion (RFI), Controlled Atmospheric Pressure Resin Infusion (CAPRI), VAP (Vacuum Assisted Process) and Single Line Injection (SLI). The composites described herein particularly include composites formed through the use of resin-soluble thermoplastic veils in a resin infusion process as described in US-2006/0252334, the disclosure of which is incorporated herein by reference. In one embodiment, the composite is manufactured through resin infusion wherein a support structure comprising structural reinforcement fibers (dry) and the resin-soluble thermoplastic veil element is placed into a bag, mold or tool to provide a perform, a curable resin matrix composition is injected/infused directly into the combined structural reinforcement fibers and veil, and then cured.

According to a further aspect of the invention, there is provided a thermoplast, or a thermoplast-modified, thermoset resin shaped product comprising or derived from a composition, pre-preg or composite as hereinbefore defined, particularly one which is obtained by a method as hereinbefore defined. Preferably such product is selected from components suitable for use in transport applications (including aerospace, aeronautical, nautical and land vehicles, and including the automotive, rail and coach industries), in building/construction applications or in other commercial applications.

According to a further aspect of the invention, there is provided a curable polymer composition, thermoset resin composition, composite or pre-preg as hereinbefore defined for use as a component in the aforementioned transport applications, or as a building/construction or other commercial product or component thereof.

The invention is now illustrated in non-limiting manner with reference to the following examples.

EXAMPLES

Synthesis of the maleimides follows several different procedures, for the m-ESEDA BMI, one method is based on the use of DMAc as a solvent, the other based on the use of DMF as a solvent. For 3'3-DDS BMI the solvent was MIBK, for 4'4-DDS BMI the solvent was DMF. For BMI ended PES/PEES polymers the solvent was DMAc.

Described are the synthetic procedures for bismaleimides based on the diamines m-ESEDA, 3'3-DDS, 4'4-DDS and PES:PEES co-polymer, having the structures below in Schematic 2 below.

Schematic 2. Diamines for BMI synthesis

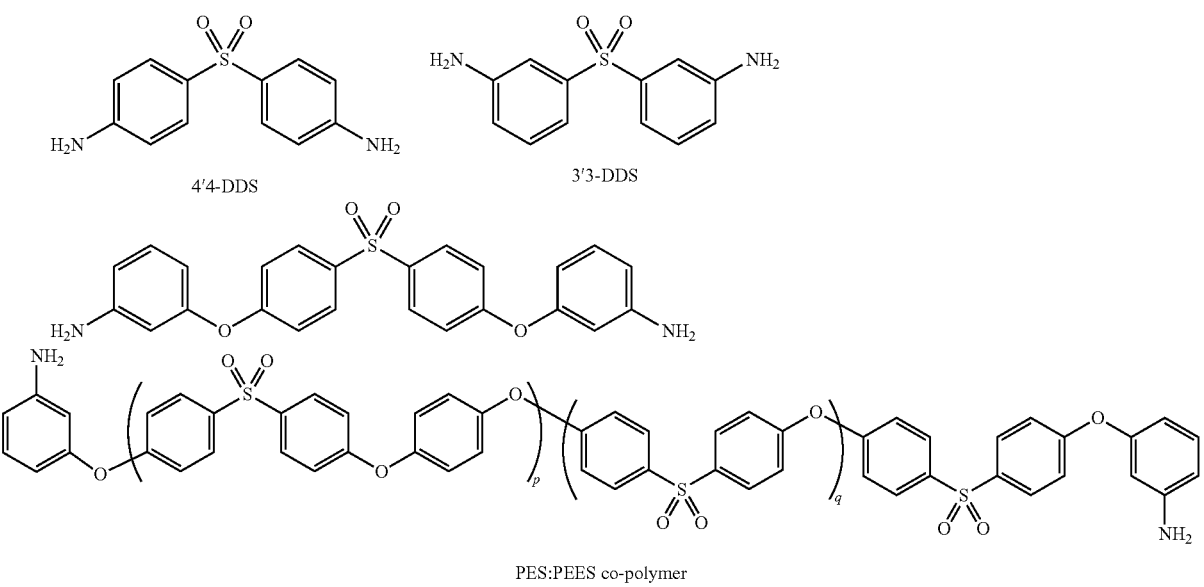

Synthesis of m-ESEDA Based Bismaleimide (BMI) Via DMF Route

Schematic 3:-
Synthesis of m-ESEDA based Bismaleimide via DMF route

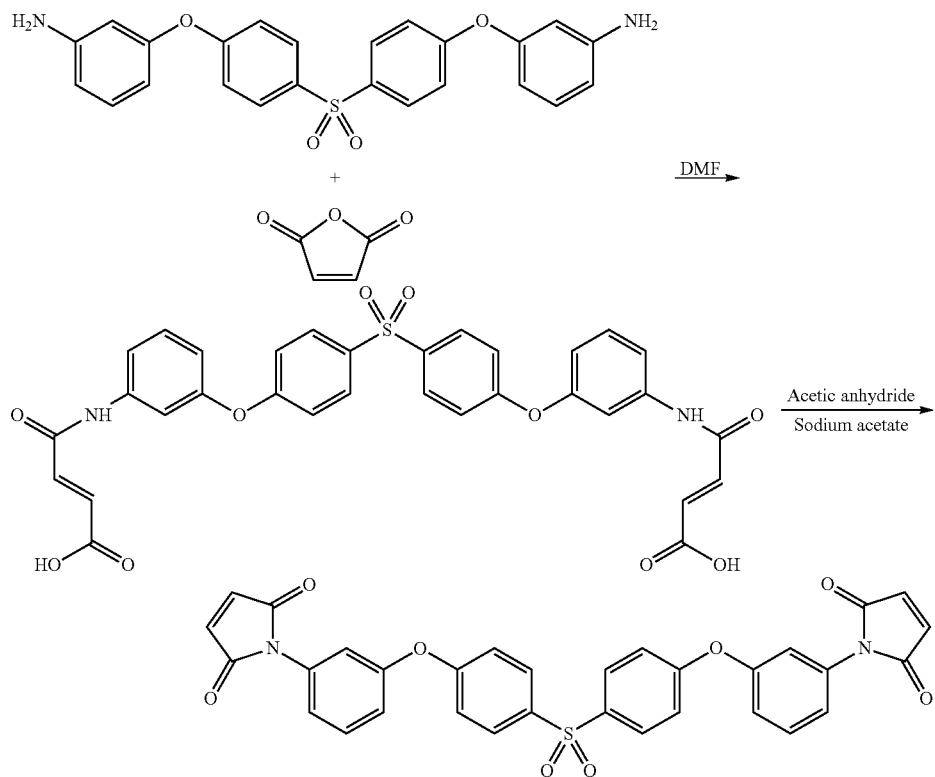

To a 5 L 4-neck round bottom flask, equipped with a reflux condenser, a thermo-couple, an over-head stirrer and a nitrogen inlet was added 0.78 mol of m-ESEDA and 600 mL DMF. To this stirred solution was added 1.78 mol of maleic anhydride in several parts; at first a drop in temperature was observed, followed by a sharp rise in temperature. To control this temperature rise the round bottomed flask was placed in an ice bath. Within 15 minutes a brownish solution was formed; LC showed no unreacted m-ESEDA remained. The solution was stirred for 120 minutes and 5.51 mol of acetic anhydride and 0.32 mol of sodium acetate were added to the reaction mixture. It was heated to 35 °C., turning dark brown in colour. After 3 hours of stirring at 35 °C., LC showed the absence of acid intermediate product. The mixture was poured over 1 Kg of ice and the mixture was stirred overnight. A tan coloured solid was observed in the flask, which was filtered and washed with water followed by a 1:1 mixture of water and methanol. To further purify the compound, it was re-slurried in water at ambient temperature, stirred for 3 hours, filtered, washed and dried in vacuum oven.

Synthesis of m-ESEDA Based Bismaleimide (BMI) Via DMAc Route maleic anhydride/m-ESEDA/DMAc solution, keeping the temperature below 20° C. The solutions were warmed to 20° C. and stirred for a further four hours. The solution was then placed in an oil bath and heated to 60° C. whilst stirring for a further two hours. The solutions were allowed to cool overnight prior to workup.

The solution was precipitated into a 5 L glass beaker containing 3.5 L of cold water. This was done whilst stirring using a PTFE air stirrer. The precipitate was stirred for an additional 20 minutes. The product was allowed to settle and the majority of the water was decanted off. The water level was then raised to 3.5 L again and stirred for a further 20 minutes. The solid was then allowed to settle and the water was again decanted off. This procedure was repeated several times over the course of one day. The precipitate was Schematic 4:-
Synthesis of m-ESEDA based Bismaleimide via DMAc route

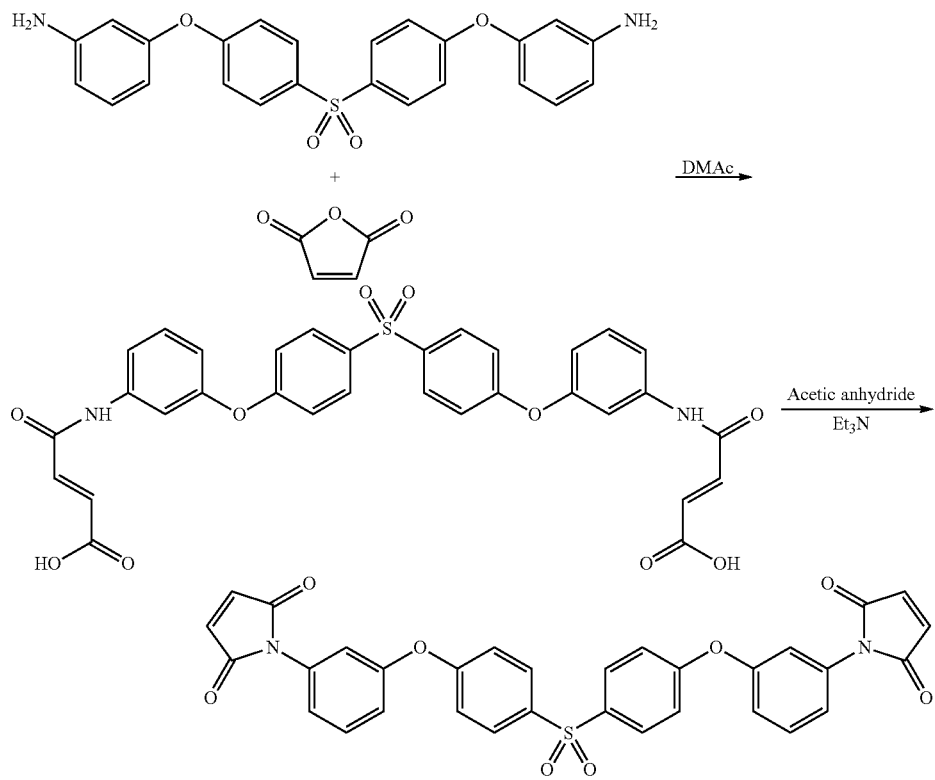

m-ESEDA (39.21g, 0.091 moles) was placed into a 500 ml glass beaker. DMAc (400 ml, 4.316 moles) was added to the beaker along with a stirring bar and the solutions were then stirred using a stirrer hot plate until the m-ESEDA was fully dissolved (approximately 15 minutes). The solutions were stored in glass jars and put in the fridge overnight to cool. The cooled solution was then added to an 800 ml glass beaker along with a stirring bar. A salt-ice bath and dry ice was placed under the glass beakers and the solution was stirred until it reached ~0° C.±2° C. Maleic anhydride (17.781 g, 0.182 moles) was added to the solution and stirred until the maleic anhydride was dissolved (approximately 15 minutes). The ice bath was removed and replaced with cold water and the solutions were left to stir at 15° C. for one hour. Triethylamine (34.5 ml, 0.248 moles) and acetic anhydride (37 ml, 0.392 moles) were added dropwise to the vacuum filtered on a sintered funnel and then covered with IPA. The solid was then vacuum filtered again and then air dried overnight. The tacky solid product was removed from the sintered funnel and stirred into 500 ml of isopropyl alcohol for 1 hour. The solid was then vacuum filtered again, and redispersed into another 500 ml IPA. After a final vacuum filtration the solid was dried in a vacuum oven at 25° C. for anything upto 3 days. The solid was broken up by hand twice a day whilst vacuum drying to speed the drying process and ensure homogeneity in the sample. The solid was ground in a pestle and mortar to ensure that a fine powder was produced prior to Soxhlet extraction.

The product was placed into a Soxhlet extraction thimble (12 cm×4.5 cm) and a filter paper was placed loosely over the top of the thimble. A 500 ml capacity round bottom flask with 300 ml capacity Soxhlet extractor was set up and the product was extracted with 420 ml of isopropyl alcohol. The extraction was run for 24 hours, over 3 days, giving approximately 40 extraction cycles. At the end of each day, the Soxhlet thimble was removed from the equipment and the product was examined. If it had solidified into a solid plug, the Soxhlet thimble was cut off and all traces of the paper thimble were scrapped off the solid product. The plug was then broken up, dried and then re-ground prior to the next day's extraction. The extraction was then repeated until it had been extracted for a total of ~24 hrs. The product was then dried in a vacuum oven at 80° C. for 6 hours. If any traces of the Soxhlet thimble got into the product an additional step was needed prior to drying, involving dissolving the product, filtering, removing the solvent in vacuo then re-grinding the solid. The product was then dried as mentioned previously.

The final purification step involved washing with 1 l of 0.1M sodium bicarbonate solution and agitating the solution with a PTFE air stirrer for 30 minutes. The product was filtered using a Buchner funnel and then washed with 1 l of water, again with 30 minutes of agitation before being filtered via Buchner funnel and dried in vacuo at 80° C.

Synthesis of 3,3'-DDS Based Bismaleimide (BMI)

Schematic 5:-
Synthesis of 3,3'-diaminodiphenyl sulfone based Bismaleimide

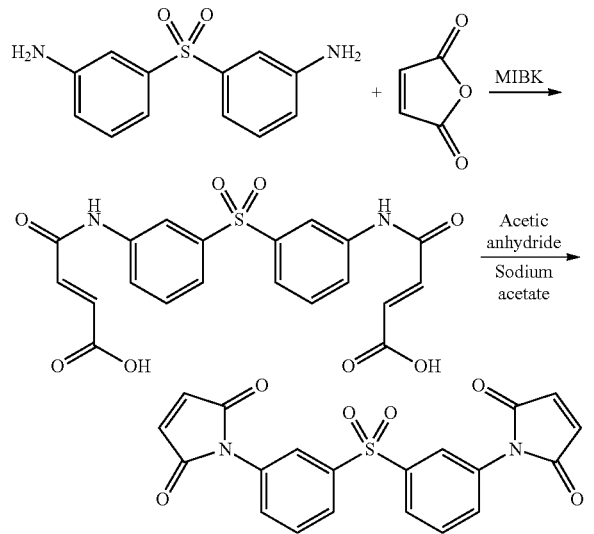

To a 5 L 4-neck round bottom flask, equipped with a reflux condenser, a thermo-couple, an over-head stirrer and a nitrogen inlet was added 0.58 mol of 3,3'-diaminodiphenyl sulfone and 2.5 L MIBK. To this stirried solution was added 1.32 mol of maleic anhydride in several parts; at first a drop in temperature was observed, followed by a sharp rise in temperature. To control this temperature rise the round bottomed flask was placed in an ice bath. Within 15 minutes the solids went into solution and the reaction mixture became faintly yellow. This was followed by the appearance of an off white solid; LC showed no unreacted m-ESEDA remained. The solution was stirred for 120 minutes, by which time a large quantity of fluffy white solid could be observed. LC showed no 3,3'-DDS remaining. 4.4 mol of acetic anhydride and 0.3 mol of sodium acetate were added to the reaction mixture and it was heated to 65° C. The reaction mixture contained a large quantity of solid but could be stirred. The white solid then started to turn bright yellow, then an off white. turning dark brown in colour. After 5 hours of stirring at 65° C., LC showed the absence of acid intermediate product. The mixture was cooled to room temperature and filtered; the off-white solid obtained was washed with MIBK, and dried in vacuum oven. Once MIBK was completely removed, the solid was re-slurried in water for 3 hours at room temperature then filtered and washed with additional water. The solid was filtered and re-slurried again, this time in water at 50° C. for 3 hours. The material was filtered, washed with additional water and dried in vacuum oven.

Synthesis of 4,4'-DDS Based Bismaleimide (BMI)

Schematic 6:-
Synthesis of 3,3'-diaminodiphenyl sulfone based Bismaleimide

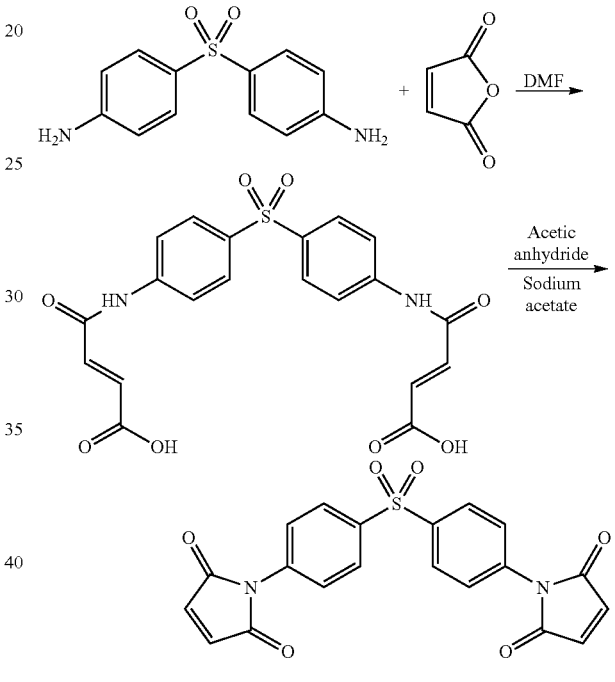

To a 5 L 4-neck round bottom flask, equipped with a reflux condenser, a thereto-couple, an over-head stirrer and a nitrogen inlet was added 1.36 mol of 4'4-DDS and 1400 mL DMF. To this stirred solution was added 3.5 mol of maleic anhydride in several parts; at first a drop in temperature was observed, followed by a sharp rise in temperature. To control this temperature rise the round bottomed flask was placed in an ice bath. Within 15 minutes all the solid had gone into solution; LC showed no unreacted 4'4-DDS remained. The solution was stirred for 120 minutes and 10.4 mol of acetic anhydride and 0.61 mol of sodium acetate were added to the reaction mixture. It was heated to 35° C., turning off white in colour. After 3 hours of stirring at 35° C., LC showed the absence of acid intermediate product. The mixture was poured over 1.5 Kg of ice and the mixture was stirred overnight. An off white coloured solid was observed in the flask, which was filtered and washed with water followed by a 1:1 mixture of water and methanol. To further purify the compound, it was re-slurried in water at ambient temperature, stirred for 3 hours, filtered, washed and dried in vacuum oven.

Synthesis of Amine Ended PES/PEES Based Bismaleimide (BMI) Via DMAc Route

Schematic 7:-
Synthesis of amine ended PES/PEES based Bismaleimide

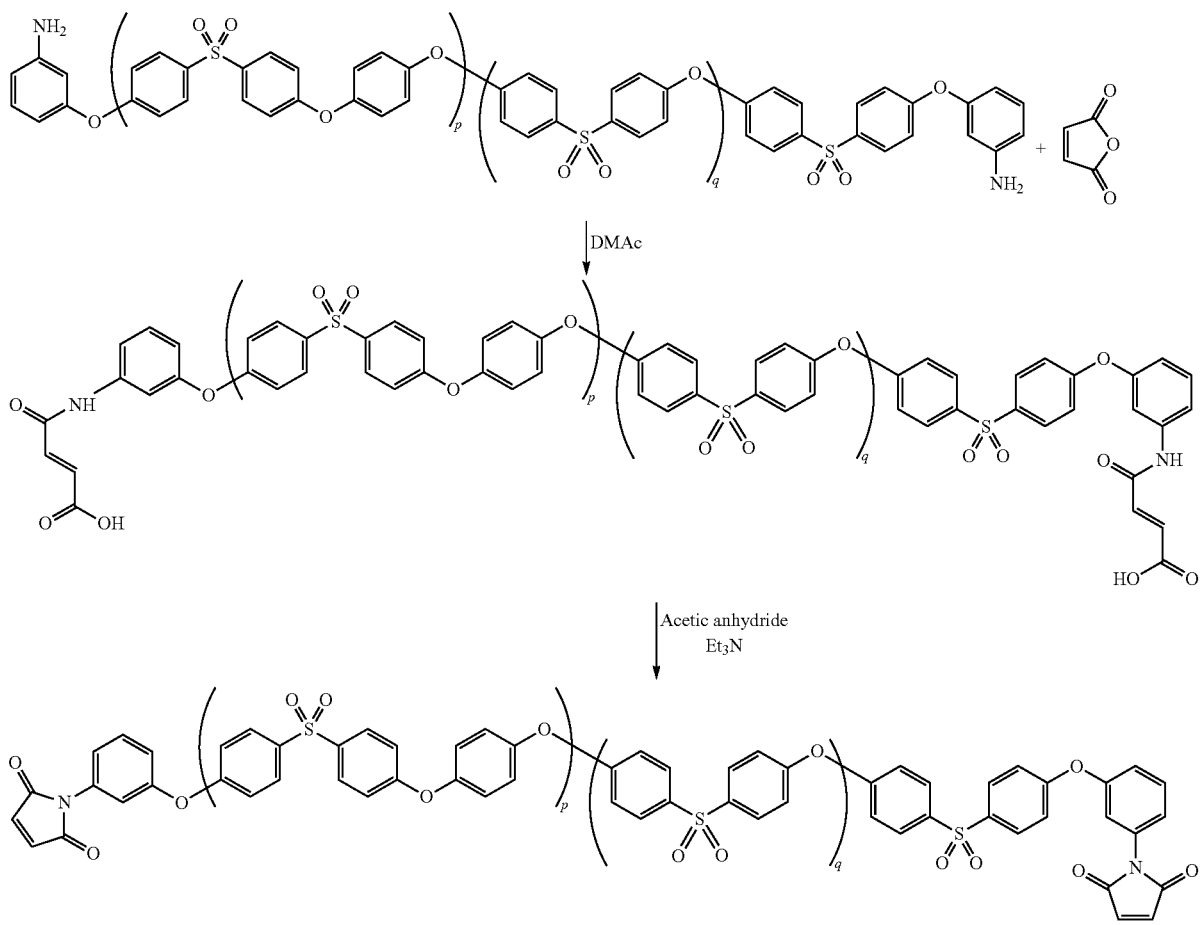

PES/PEES-BMI-Mn8400

The procedure was identical to that used for the m-ESEDA BMI synthesis in DMAc, although the amine ended PES/PEES polymer replaced the m-ESEDA and the amounts were as follows. 0.225 g (2.3 mmol) of maleic anhydride was reacted with 9.904 g (1.2 mmol) of amine ended PES/PEES polymer ($M_w$=8400 g mol$^{-1}$) in 50 ml of DMAc. Cyclisation was carried out using 1 ml of acetic anhydride and 1 ml triethylamine.

Precipitation was carried out by adding the water dropwise to the DMAc solution until in excess followed by quick addition of the remaining 400 ml. 8.43 g of a fine grey powder was obtained after drying giving a crude yield of 84%.

PES/PEES-BMI-Mn6600

The procedure was identical to that used for the m-ESEDA BMI synthesis in DMAc, although the amine ended PES/PEES polymer replaced the m-ESEDA and the amounts were as follows. 0.296 g (3.0 mmol) of maleic anhydride was reacted with 9.879 g (1.5 mmol) of KM ($M_w$=6554 g mol$^{-1}$) in 50 ml of DMAc. Cyclisation was carried out using 1 ml of acetic anhydride and 1ml triethylamine. 8.59 g of a fine grey powder was obtained after drying giving a crude yield of 86%.

PES/PEES-BMI-Mn3500

The procedure was identical to that used for the m-ESEDA BMI synthesis in DMAc, although the amine ended PES/PEES polymer replaced the m-ESEDA and the amounts were as follows. 0.765 g (7.8 mmol) of maleic anhydride was reacted with 9.360 g (3.9 mmol) of KM ($M_w$=2400 g mol$^{-1}$) in 50 ml of DMAc. Cyclisation was carried out using 1 ml of acetic anhydride and 1 ml triethylamine. 6.88 g of a fine grey powder was obtained after drying giving a crude yield of 69%.

General Blendinga Curing Procedure

Resin blends were prepared by first mixing diallylbisphenol-A (DBA) with t-butyl hydroquinone (THQ) in a glass jar for 15 min at 120° C. in an oil bath. Once there was complete mixing the jar was removed from the heat and BMI-H was added with the blend being stirred until homogeneous. At this point any m-ESEDA BMI was added in small portions and again stirred until homogeneous. Any thermoplastic toughening agent (a PES:PEES co-polymer of formula I or II herein) was added in a small portion, the blend was stirred until homogeneous and then another portion was added and blended until homogeneous. This was continued until all of the thermoplastic was added (normally around 5 portions). Any powder sticking to the sides of the jar was scraped into the blend. The jar was then returned to the oil bath and stirred at high speed at 120° C. for 45 minutes.

The thick solution was then poured into a mould, degassed at 100° C. for 2-3 h (2 h for DMTA sized dishes and 3 h for 6"×4" mechanical plaques) before being cured. The curing cycle was that of 5250-4, 121° C. to 177° C. at 3° C./min, followed by a hold for 6 h.

Cooldown was at 3° C./min to room temperature. A postcure was then applied at 25° C. to 227° C. for 6 h, with a cooldown of 3° C./min.

BMI Blends

PES/PEES Polymer Toughening Agents

A number of different blends prepared with PES/PEES polymer are summarised in Table 1.

TABLE 1

Blends of BMI's with PES/PEES polymer

| BMI ratio | | PES/PEES |
|---|---|---|
| BMI-H | m-ESEDA BMI | Polymer (wt %) |
| 100 | 0 | 0 |
| 100 | 0 | 10 |
| 100 | 0 | 20 |
| 70 | 30 | 0 |
| 70 | 30 | 10 |
| 70 | 30 | 20 |

The PES/PEES polymer described in Table 1 is amine-ended with a Mn ~8200. THQ was present at 1% in all blends.

Mechanical Properties

Note that the 20% PES/PEES containing specimens were not analysed for their mechanical properties as they showed a phase inverted morphology, a morphology unsuitable for the desired use of the material. Mechanical properties are given in Table 2.

TABLE 2

Mechanical properties

| Plaque Formulation | $K_{1C}$ (MPa m$^{0.5}$) | $K_{1C}$ (MPa m$^{0.5}$) SD | $G_{1C}$ (Jm$^2$) | $G_{1C}$ (Jm$^2$) SD | E modulus (GPa) | E modulus (GPa) SD |
|---|---|---|---|---|---|---|
| High Tg commercial epoxy resin | 0.69 | 0.02 | 145 | 10 | 3.54 | 0.08 |
| BMI-H/DBA/1% THQ | 0.7 | 0.02 | 150 | 9 | 3.78 | 0.15 |
| BMI-H/DBA/10% KM-177/1% THQ | 0.92 | 0.04 | 259 | 23 | 3.79 | 0.08 |
| BMI-H/BDA/m-ESEDA BMI/1% THQ | 0.7 | 0.03 | 150 | 13 | 3.75 | 0.5 |
| BMI-H/DBA/m-ESEDA BMI/10% KM-177/1% THQ | 0.86 | 0.07 | 224 | 36 | 3.59 | 0.49 |
| | 0.88 | 0.04 | 236 | 22 | 3.78 | 0.15 |

Thermomechanical Properties

The DMTA Peak Tan delta for blends of BMI-H, DBA, THQ and/or m-ESEDA BMI and/or amine ended PES/PEES polymer is shown in FIG. 1. Note that there is a ~26° C. drop between the unmodified system and the compatibilised, toughened system.

Solvent Uptake

Studies on the level of solvent uptake using MEK and water have also been undertaken. These solvent uptake studies involved refluxing the solvents for ~6.5 h per day, then leaving the samples to soak in the solvent overnight. This process was repeated for >30 days. The results are shown in FIG. 2 (MEK) and FIG. 3 (water).

Figure 2:
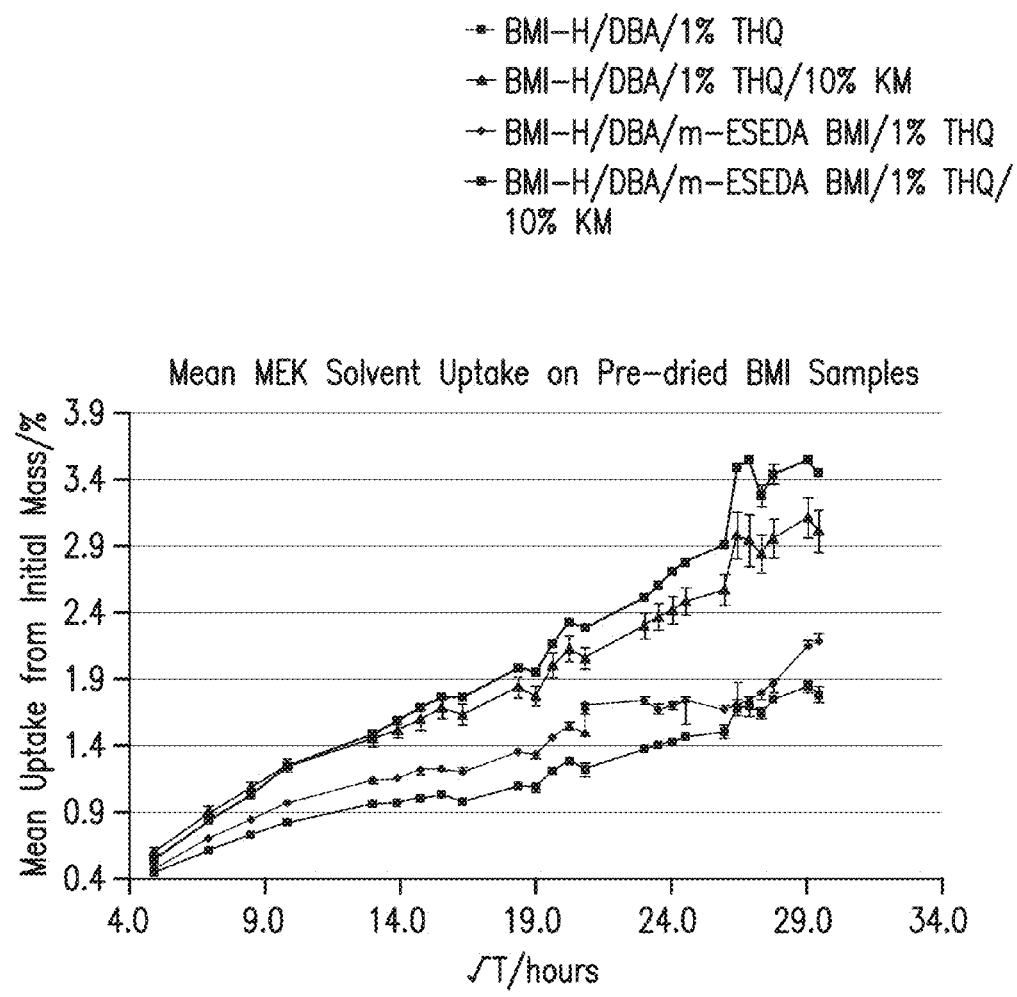
Figure 3:
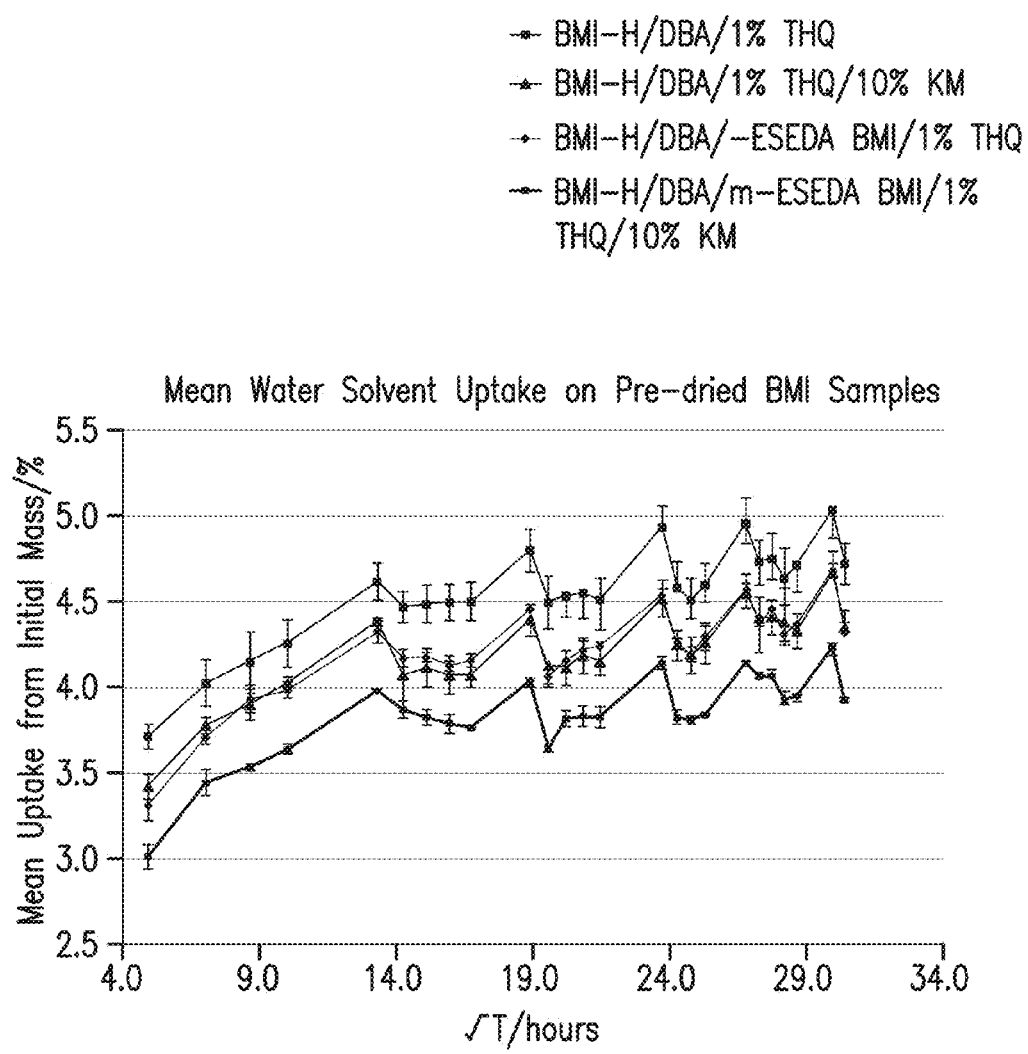

FIG. 2 shows that the toughened systems do pick up more solvent than the non-toughened systems but only by ~1% over 36 days. The compatibilised systems also pick up more MEK, by around 0.4%-0.5% over 36 days.

Thermo-Oxidative Stability

The therm-oxidative stability of the toughened and non-toughened samples have been examined for their thermo-oxidative stability. Samples were held at 200° C. and measured for weight loss over time. This data has been plotted graphically in FIG. 4.

Figure 4:
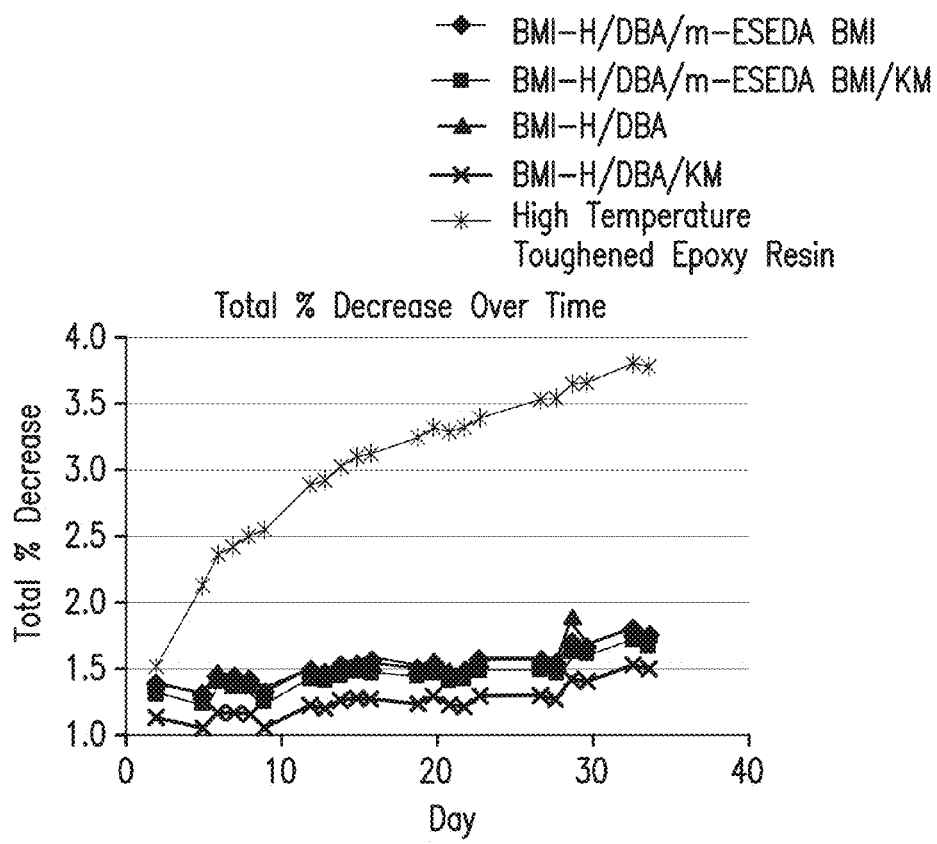

FIG. 4 shows that all of the blends, toughened, non-toughened, compatibilised and non-compatibilised have very similar weight loss over time. A comparison sample based on a commercial epoxy resin system is included for reference.

Rheology

Figure 5:
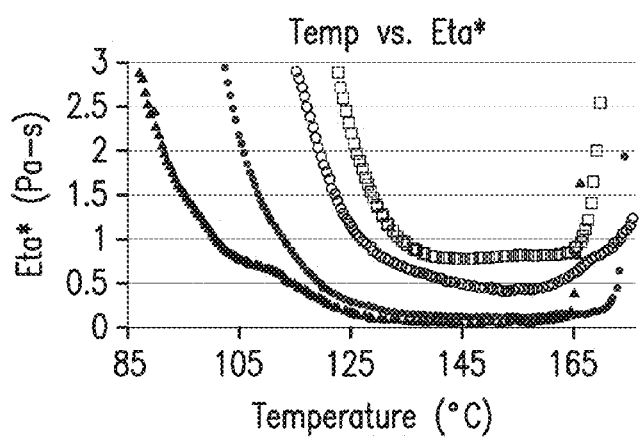

Rheology studies on the blends of resins to determine if the addition of toughening agents gave a level of flow control. This flow control would be an additional benefit to the processing of BMI systems. The rheology trace for blends of BMI with and without compatibiliser and toughening agent are shown in FIG. 5. It can be seen from FIG. 5 that the viscosity of the toughened blends is indeed higher than the non-toughened systems. The addition of 10% PES/PEES polymer raises the viscosity from around 100 cP to around 420-830 cP. As a comparison, a commercial BMI resin, has a viscosity around 40 cP, a high flow epoxy resin, ~1000 cP. This increase in viscosity may lead to less resin bleed out during composite manufacture.

High-Tg Sulfone-containing Toughening Agents

A higher Tg polymer containing sulfone units was prepared so that the effective use temperature of the cured blend was raised. The modulus of the cured systems dropped off above the Tg of the thermoplastic toughener and so a toughener with a Tg close to that of the neat BMI resin was sought. This polymer is described in Schematic 1 and formula II herein. A number of blends containing high-Tg sulfone containing polymers were also examined. These are detailed in Table 3.

TABLE 3

Blends of BMI's with PES:Biphenyl polymer of formula II

| BMI ratio | | 6500 Mn polymer-Amine ended Polymer backbone ratio | | | % wt |
|---|---|---|---|---|---|
| BMI-H | m-ESEDA BMI | m-ESEDA (PES:Biphenyl) 50:50 | 25:75 | 0:100 | polymer |
| 100 | 0 | x | | | 10 |
| 100 | 0 | | x | | 10 |
| 100 | 0 | | | x | 10 |
| 70 | 30 | x | | | 10 |
| 70 | 30 | | x | | 10 |
| 70 | 30 | | | x | 10 |

TABLE 3-continued

Blends of BMI's with PES:Biphenyl polymer of formula II

| BMI ratio | | 6500 Mn polymer-Amine ended Polymer backbone ratio | | | % wt polymer |
|---|---|---|---|---|---|
| m-ESEDA BMI-H | BMI | (PES:Biphenyl) 50:50 | 25:75 | 0:100 | |
| 100 | 0 | x | | | 20 |
| 100 | 0 | | x | | 20 |
| 100 | 0 | | | x | 20 |
| 70 | 30 | x | | | 20 |
| 70 | 30 | | x | | 20 |
| 70 | 30 | | | x | 20 |

Morphology

The morphology of the cured and toughened samples were analysed by scanning electron microscopy (SEM).

Figure 6:
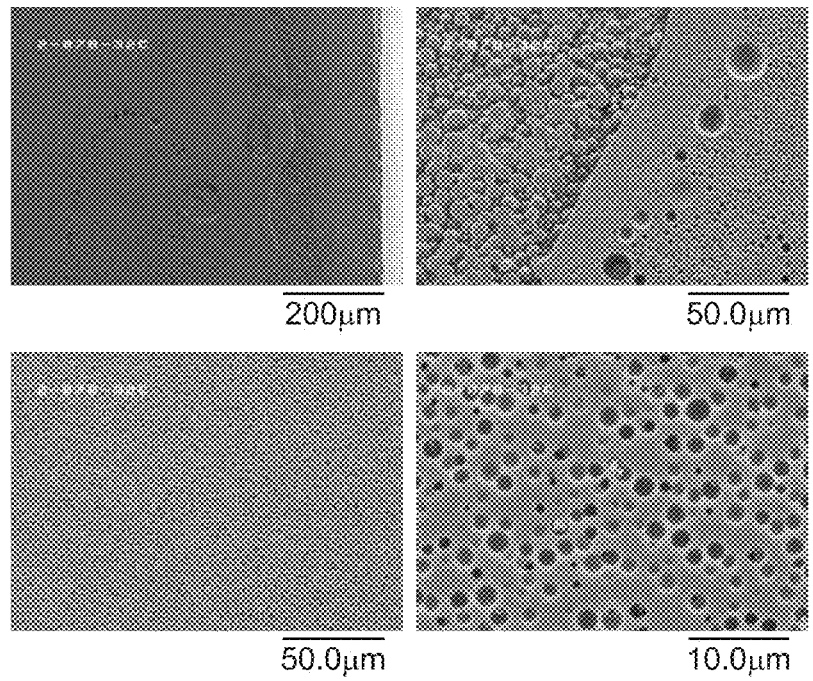

FIG. 6 shows the 10% PES/PEES toughened BMI-H, DBA, THQ system, which shows some fine particulate morphology but some gross, phase inverted areas, predominantly close to edges, suggesting demixing.

Figure 7:
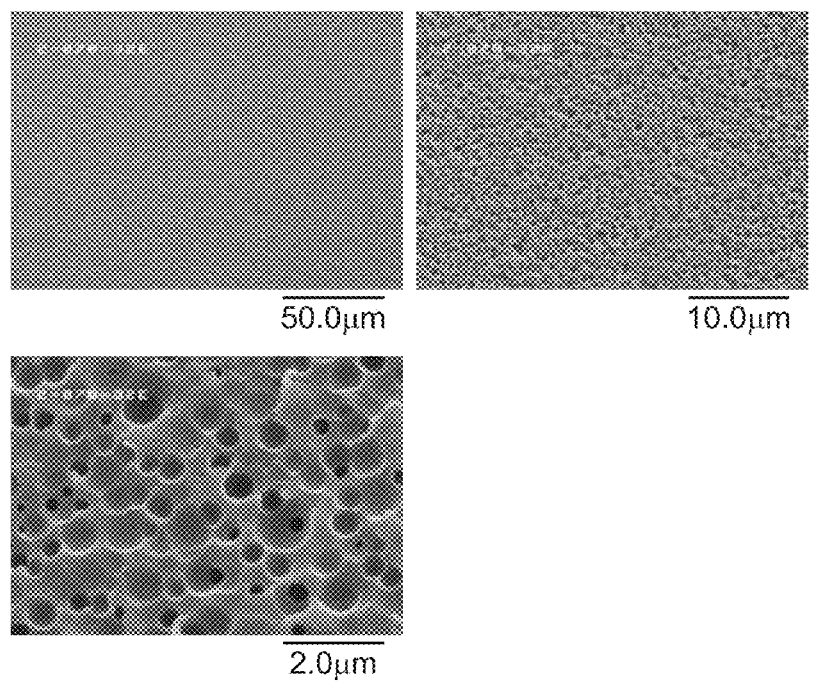

FIG. 7 shows the SEM images of a resin system compatibilised with m-ESEDA BMI, and in particular the 10% PES/PEES, 70:30 BMI-H:m-ESEDA BMI, DBA and THQ system. The fine particulate morphology is present and consistent throughout the resin and no large, phase inverted areas are present. Thus, FIG. 7 shows a highly homogenous fine particulate morphology, as well as extremely fine particulate morphology.

The invention claimed is:

1. A curable polymer composition comprising:
   (A) a thermoset maleimide resin precursor component;
   (B) an arylsulphone-containing maleimide component; and
   (C) a polyarylpolymer thermoplastic toughening agent which comprises at least one SO$_2$ group in the polymer chain but does not comprise maleimide pendant or end-groups,
   wherein the weight proportions, based on the total weight of components (A), (B) and (C), are from 20% to 45% by weight of component (B) and from 5% to 20% by weight of component (C).

2. The curable polymer composition according to claim 1 further comprising one or more additional toughening agent(s), wherein at least one of said additional toughening agent(s) is/are in particulate form.

3. The curable polymer composition according to claim 1, wherein said maleimide resin precursor component is a bismaleimide resin precursor.

4. The curable polymer composition according to claim 1, wherein said arylsulphone-containing maleimide component (B) is an arylsulphone-containing bismaleimide component.

5. The curable polymer composition according to claim 1, wherein said thermoset maleimide component comprises one or more polymerisable bismaleimide compound(s), optionally with a mono-functional or tri-functional or tetra-functional maleimide.

6. The curable polymer composition according to claim 1 further comprising one or more co-reactants selected from the group consisting of: allylnadicimide resins; epoxy resins; di- and poly-amines; cyanate resins; unsaturated polyester resins; alkenylphenol-terminated compounds; comonomers characterized by the presence of one or more —CH=CH$_2$, >C=CH$_2$, or —C=CH— groups polymerizable with the carbon-carbon double bonds of the maleimide groups; and silicone rubbers terminated with maleimide, epoxy, vinyl or amino groups.

7. The curable polymer composition according to claim 1 further comprising one or more co-reactants selected from alkenyloxyphenols and alkenylphenols.

8. The curable polymer composition according to claim 1 further comprising one or more co-reactants selected from: o,o'-diallybisphenols; o,o'-dipropenylbisphenols; allylphenoxy; propenylphenoxy; allylphenyl; propenylphenyl-terminated oligomeric compounds; and alkenylphenol- or alkenyloxyphenyl terminated dicyclopentadienes.

9. The curable polymer composition according to claim 1 further comprising at least one radical inhibitor or catalyst.

10. The curable polymer composition according to claim 1, wherein the polyarylpolymer thermoplastic toughening agent comprises sequences of phenylene groups linked either as fused rings, through a single chemical bond or through a divalent group selected from SO$_2$, CO, O, S and a divalent hydrocarbon.

11. The curable polymer composition according to claim 1, wherein said arylsulphone-containing maleimide component (B) is a bismaleimide group of formula (III):

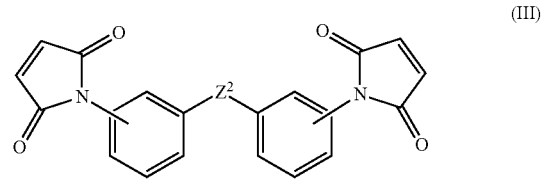

(III)

wherein Z$^2$ is a sulfone —[SO$_2$]— group or comprises one or more arylsulphone unit(s), —[Ar—SO$_2$—Ar]—, and optionally further comprises one or more arylene unit(s) —[Ar]—, wherein said arylsulphone unit(s) and arylene unit(s) are linked either as fused rings, through a single chemical bond or through a divalent group selected from SO$_2$, CO, O, S and a divalent hydrocarbon.

12. The curable polymer composition according to claim 11 wherein Ar is phenylene.

13. The curable polymer composition according to claim 1, wherein said arylsulphone-containing maleimide component (B) is selected from m-ESEDA-bismaleimide, 3,3'-DDS-bismaleimide and 4,4'-DDS-bismaleimide represented by the following structures (a)-(c), respectively:

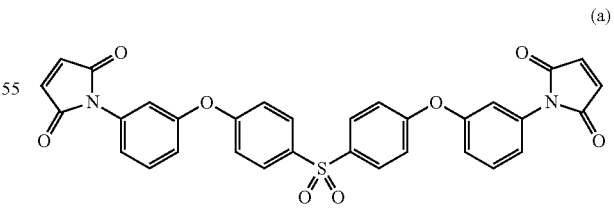

(a)

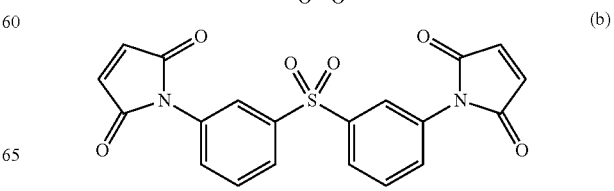

(b)

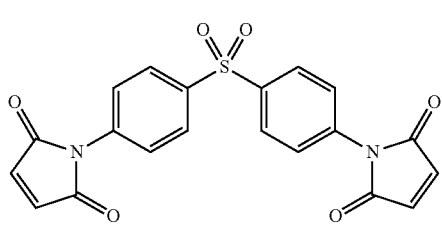
(c)

14. The curable polymer composition according to claim 1, wherein the number average molecular weight of the arylsulphone-containing maleimide component (B) is less than 2000.

15. The curable polymer composition according to claim 1, wherein the thermoset maleimide resin precursor component (A) comprises a bismaleimide, wherein the arylsulphone-containing maleimide component (B) is selected from m-ESEDA-bismaleimide, 3,3'-DDS-bismaleimide and 4,4'-DDS-bismaleimide, and wherein the polyarylpolymer thermoplastic toughening agent (C) is an amine-ended PES:PEES polyarylsulphone.

16. The curable polymer composition according to claim 1, wherein the polyarylpolymer thermoplastic toughening agent (C) comprises a combination of polyethersulphone (PES) and polyetherethersulphone (PEES) ether-linked repeating units.

17. A composite comprising reinforcing fibers and the curable polymer composition of claim 1, wherein said fibers are present at a concentration of 30 to 70% by weight.

18. The composite according to claim 17 wherein said fibers are selected from the group consisting of: glass, alumina, zirconia, silicon carbide, compound ceramics, aluminum, titanium, boron, carbon, graphite, poly paraphenylene terephthalamide, poly(benzothiazole), poly(benzimidazole) and poly(benzoxazole) fibers.

* * * * *